US010982588B2

(12) United States Patent
Kim et al.

(10) Patent No.: US 10,982,588 B2
(45) Date of Patent: Apr. 20, 2021

(54) COMPRESSION IGNITION ENGINE

(71) Applicant: MAZDA MOTOR CORPORATION, Hiroshima (JP)

(72) Inventors: Sangkyu Kim, Higashihiroshima (JP); Takashi Sumimoto, Hiroshima (JP); Shintaro Okada, Higashihiroshima (JP); Daisuke Shimo, Hiroshima (JP); Shuji Takuma, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/740,269

(22) Filed: Jan. 10, 2020

(65) Prior Publication Data
US 2020/0232380 A1 Jul. 23, 2020

(30) Foreign Application Priority Data

Jan. 18, 2019 (JP) .............................. JP2019-007030

(51) Int. Cl.
*F02B 23/00* (2006.01)
*F02B 23/06* (2006.01)
*F02D 35/02* (2006.01)
*F02D 1/16* (2006.01)
*F02D 41/34* (2006.01)
*F02B 1/14* (2006.01)

(52) U.S. Cl.
CPC ............ *F02B 23/0648* (2013.01); *F02B 1/14* (2013.01); *F02B 23/0621* (2013.01); *F02D 1/16* (2013.01); *F02D 35/028* (2013.01); *F02D 41/345* (2013.01); *F02D 2200/0618* (2013.01)

(58) Field of Classification Search
CPC .... F02B 23/0648; F02B 23/0621; F02B 1/14; F02D 35/028; F02D 1/16; F02D 41/345; F02D 41/401; F02D 41/3035; F02D 41/405; F02D 41/402; F02D 2200/0618
See application file for complete search history.

(56) References Cited

U.S. PATENT DOCUMENTS 3,650,259 A * 3/1972 Garnier .............. F02M 41/1411
123/364
5,829,412 A * 11/1998 Klatt .................... F02D 41/266
123/500

(Continued)

FOREIGN PATENT DOCUMENTS

JP       2010-101243 A      5/2010

*Primary Examiner* — Phutthiwat Wongwian
*Assistant Examiner* — Sherman D Manley
(74) *Attorney, Agent, or Firm* — Studebaker & Brackett PC

(57) ABSTRACT

A cavity includes a lower-side cavity, an upper-side cavity, a first lip and a second lip. The upper-side cavity has a guide curved surface which extends along a circumference of a first imaginary circle in a section along a cylinder-axis direction, and the first lip has a curved surface which extends along a circumference of a second imaginary circle in a section along the cylinder-axis direction. An angle X which a cylinder axis makes with a common tangential line of the first imaginary circle and the second imaginary circle is set as 75°<X<80°. The guide curved surface is configured such that an angle Y of this guide curved surface which occupies at the circumference of the first imaginary circle is set as 80°<Y<(180°−X).

11 Claims, 18 Drawing Sheets

(56) References Cited

U.S. PATENT DOCUMENTS

| | | | | |
|---|---|---|---|---|
| 6,152,101 | A * | 11/2000 | Parsi | F02B 23/0672 123/276 |
| 6,935,301 | B2 * | 8/2005 | Liu | F02F 3/26 123/294 |
| 8,156,927 | B2 * | 4/2012 | Iikubo | F02B 23/0672 123/661 |
| 9,429,065 | B2 * | 8/2016 | Zoeller | F02B 23/0624 |
| 9,476,346 | B2 * | 10/2016 | Zoeller | F02B 17/005 |
| RE46,806 | E * | 4/2018 | Venugopal | F02B 23/0651 |
| 9,938,888 | B2 * | 4/2018 | Huang | F02B 23/101 |
| 10,570,808 | B2 * | 2/2020 | Fukuda | F02B 23/0645 |
| 2010/0258077 | A1 * | 10/2010 | Asai | F02B 23/0693 123/294 |
| 2015/0354439 | A1 * | 12/2015 | Shimo | F02F 3/26 123/659 |
| 2017/0145901 | A1 * | 5/2017 | Uehara | F02B 23/0669 |
| 2017/0159549 | A1 * | 6/2017 | Uehara | F02B 23/0672 |
| 2020/0149465 | A1 * | 5/2020 | Kurtz | F02B 23/0687 |

\* cited by examiner

CA=ATDC−8°

CA=ATDC0° (TDC)

CA=ATDC10°

CA=ATDC20°

< Comparative Example 1 >

CA=ATDC25°

CA=ATDC30°

CA=ATDC40°

CA=ATDC50°

< Comparative Example 2 >

(A) CA=ATDC25°

CA=ATDC30°

CA=ATDC40°

CA=ATDC50°

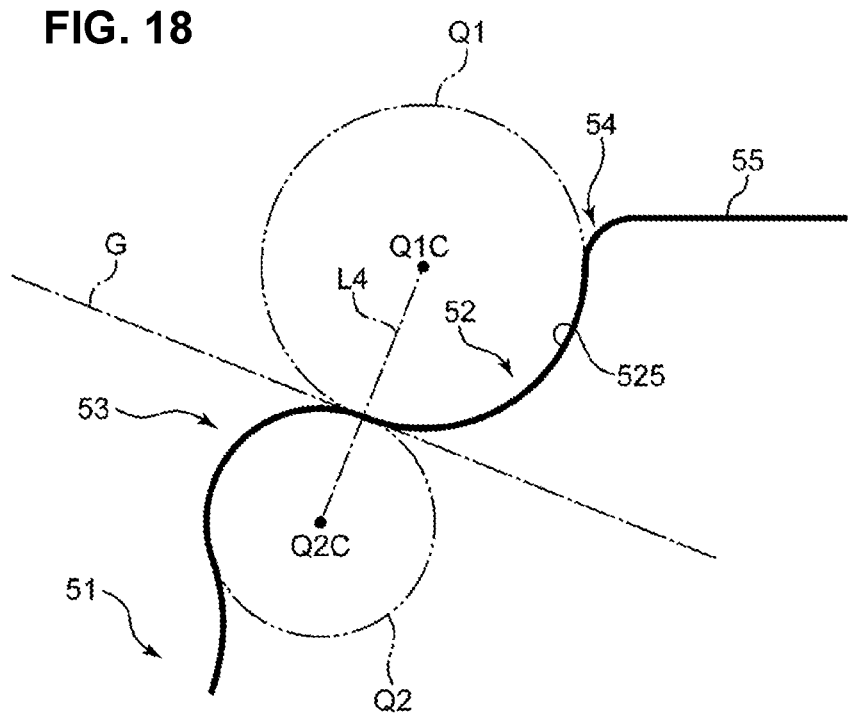

… (1)

COMPRESSION IGNITION ENGINE

BACKGROUND OF THE INVENTION

The present invention relates to a compression ignition engine in which a part of a combustion chamber is formed by a piston provided with a cavity.

The combustion chamber of an engine for a vehicle, such as an automotive vehicle, is formed by an inner wall surface of a cylinder, a bottom surface of a cylinder head (a ceiling surface of the combustion chamber) and a crown surface of the piston. In a direct-injection type compression ignition engine, fuel is supplied into the combustion chamber from a fuel injector provided at a central portion, in a radial direction, of the ceiling surface of the combustion chamber. An engine in which the cavity and a squish area enclosing the cavity are provided at the crown surface of the piston and the fuel is injected from the fuel injector toward the cavity is known. Further, an engine in which the cavity has a two-stage structure in which an upper-side cavity and a lower-side cavity are provided and the fuel is injected toward a lip which is located at a middle position between the both cavities at a compression top dead center is known (Japanese Patent Laid-Open Publication No. 2010-101243).

An ideal manner of combustion in the combustion chamber is to achieve the combustion such that air existing in the combustion chamber is used up. In an engine where a bottom surface of the combustion chamber is formed by the crown surface of the piston provided with the above-described upper/lower two-stage structural cavity, it is important that a fuel spray is made to separately flow into the upper-side cavity and the lower-side cavity, thereby effectively utilizing oxygen existing in the cavities. Further, it is also preferable that oxygen existing in respective spaces above the cavity and the squish area be effectively utilized.

According to a conventional structure of the combustion chamber (the crown surface of the piston), however, there is a case where the fuel spray injected toward the cavity remains in the upper-side cavity. In this case, there is a problem that the fuel spray may not sufficiently spread out into the both spaces above the upper-side cavity and the squish area, so that appropriate combustion sufficiently utilizing the oxygen existing in these spaces may not be achieved.

SUMMARY OF THE INVENTION

An object of the present invention is to provide a compression ignition engine in which a part of the combustion chamber is formed by the crown surface of the piston provided with the upper/lower two-stage structural cavity and the squish area, which can achieve the combustion using up the oxygen existing in the combustion chamber.

The present invention is a compression ignition engine, comprising a combustion chamber formed by a cylinder, a crown surface of a piston, and a ceiling surface of a cylinder head, a fuel injector provided at a central portion, in a radial direction, of the ceiling surface and injecting fuel into the combustion chamber, an upper-side cavity provided at the crown surface of the piston, the upper-side cavity being configured to have a ring shape, in a top view, and be recessed downwardly, in a cylinder-axis direction, from the crown surface, a lower-side cavity provided at the crown surface of the piston on an inward side, in the radial direction, of the upper-side cavity and on a downward side, in the cylinder-axis direction, of the upper-side cavity, the lower-side cavity being configured to be recessed downwardly, in the cylinder-axis direction, from the crown surface, a first lip provided at the crown surface of the piston and connecting the upper-side cavity and the lower-side cavity, the first lip being configured to have a curved surface protruding inwardly in the radial direction of the cylinder, and a squish area provided at the crown surface of the piston on an outward side, in the radial direction, of an upper end, in the cylinder-axis direction, of the upper-side cavity, the squish area being a flat surface extending in a direction perpendicular to a cylinder axis, wherein the upper-side cavity has a first curved surface which extends upwardly in the cylinder-axis direction, protruding outwardly in the radial direction, along a circumference of a first imaginary circle, in a section along the cylinder-axis direction, the first lip has a second curved surface which extends along a circumference of a second imaginary circle in a section along the cylinder-axis direction, an angle (X) which the cylinder axis makes with a common tangential line of the first imaginary circle and the second imaginary circle which is interposed between respective center points of the first and second imaginary circles and configured such that a contact point thereof with the second imaginary circle is positioned on an inward side, in the radial direction, of a contact point thereof with the first imaginary circle is set within a range of 75 to 80 degrees (75°<X<80°), and the first curved surface of the upper-side cavity is configured such that an angle (Y) of the first curved surface which occupies at the circumference of the first imaginary circle is set within a range of 80 to (180−the angle X) degrees (i.e., 80°<Y<(180°−X)).

According to the present invention, since the angle (X) of the common tangential line is set as 75°<X<80°, an area which is continuous from the first lip to the first curved surface is configured to have an inclination which substantially matches (coincides with) an inclination (a corn angle) of an injection-hole axis of a general fuel injector. Accordingly, the fuel spray injected by the fuel injector can be introduced into the upper-side cavity properly. Further, by setting the angle (Y) of the first curved surface occupying at the circumference of the first imaginary circle to be larger than 80°, the fuel spray introduced into the upper-side cavity is guided by the first curved surface, so that this fuel spray can be introduced into the space above the upper-side cavity. Moreover, by setting the angle (Y) to be smaller than (180°−X), the fuel spray is not excessively introduced into the space above the upper-side cavity and appropriately introduced into the space above the squish area as well. Accordingly, the combustion effectively utilizing the oxygen existing in both the space above the upper-side cavity and the space above the squish area can be achieved.

In an embodiment of the present invention, the upper-side cavity includes a slant flat surface which extends from a connection portion thereof to the first lip up to a starting point of the first curved surface and lowers toward an outward side in the radial direction.

According to this embodiment, the fuel spray injected toward the upper-side cavity can be guided into a deep area of the upper-side cavity along the slant flat surface, then guided such that the fuel spray is rotated upwardly in the cylinder-axis direction along the first curved surface, and then this fuel spray can be directed toward the spaces above the upper-side cavity and the squish area.

Herein, it is preferable that the slant flat surface be configured such that an inclination thereof substantially matches (coincides with) an inclination of an injection-hole axis which corresponds to a fuel-injection direction of fuel injected from an injection hole of the fuel injector. In this case, a degree of interference with flowing of the fuel spray becomes the minimum, so that the fuel spray can be made to flow smoothly.

In another embodiment of the present invention, a second lip connecting the first curved surface and the squish area is provided at the crown surface of the piston, the second lip has a third curved surface which extends along a circumference of a third imaginary circle, and a radius (R1) of the first imaginary circle, a radius (R2) of the third imaginary circle, and a distance (Sh), in the radial direction, between the respective center points of the first and second imaginary circles are set such that a relationship expressed by R1+R2=Sh (including R2=0) is satisfied.

According to this embodiment, a situation where the second lip protrudes inwardly, in the radial direction, relative to the first curved surface or the first curved surface does not sufficiently rise upwardly in the cylinder-axis direction can be securely avoided. Accordingly, it is likely that the fuel spray is uniformly distributed to both of the space above the upper-side cavity and the space above the squish area.

In another embodiment of the present invention, a radius (a) of the piston and a width (b), in the radial direction, of the squish area are set such that a ratio (a/b) of the radius (a) to the width (b) falls within a range of 8-4.

According to this embodiment, since the ratio (a/b) is within the range of 8-4, a range of the squish area at the crown surface of the piston is relatively narrow. Herein, by setting the angle (Y) of the first curved surface as 80°<Y< (180°–X) in the combustion chamber having the above-described relatively-narrow squish area, the fuel spray can be introduced into the space above the squish area properly. Accordingly, the oxygen existing in the space above the squish area can be effectively utilized and the fuel spray can be prevented from adhering to a cylinder liner.

In another embodiment of the present invention, the compression ignition engine further comprises a fuel injection controller to control execution of fuel injection of the fuel injector, wherein the fuel injection controller sets a fuel injection timing such that a fuel spray injected by the fuel injector flows into the upper-side cavity at a timing when the first imaginary circle contacts the ceiling surface of the combustion chamber while the piston lowers.

Herein, the fuel spray flowing into the upper-side cavity is guided by the first curved surface extending along the first imaginary circle and then flows upwardly out of the upper-side cavity. According to the setting of the fuel injection timing of this embodiment, the combustion which utilizes the oxygen existing in the respective spaces above the upper-side cavity and the squish area which gradually expand in accordance with the lowering of the piston can be achieved. Further, a part of the fuel spray which has flowed upwardly out of the upper-side cavity flows inwardly in the radial direction, and this part of the fuel spray tends to advance in a flow path which extends along the first imaginary circle. Accordingly, the fuel spray can be suppressed from hitting against the ceiling surface of the combustion chamber by setting the fuel injection timing as recited in this embodiment. That is, while hitting of the fuel spray against the ceiling surface so weakens the flow of the fuel spray that the fuel spray may not sufficiently spread into the spaces above the upper-side cavity and the squish area, this problem of insufficient spreading can be properly prevented by this embodiment.

In another embodiment of the present invention, the compression ignition engine further comprises a fuel injection controller to control execution of fuel injection of the fuel injector, wherein the fuel injection controller is configured to execute a pre-injection in which the fuel is injected at an advanced timing from a compression top dead center and a main-injection in which the fuel is injected at a delayed timing from the injection timing of the pre-injection, and the fuel injection controller is configured to set the respective fuel injection timings of the pre-injection and the main-injection such that a fuel spray injected by the pre-injection and at least a latter half of a fuel spray injected by the main-injection flow into the upper-side cavity.

According to this embodiment, in the combustion caused by the pre-injection and the main-injection, the combustion effectively utilizing the oxygen existing in the combustion chamber can be achieved.

Other features, aspects, and advantages of the present invention will become apparent from the following description which refers to the accompanying drawings.

BRIEF DESCRIPTION OF THE DRAWINGS

FIG. 18 is a schematic diagram showing a shape of an upper-side cavity according to a modified example.

DETAILED DESCRIPTION OF THE INVENTION

[Whole Structure of Engine]

Figure 1:
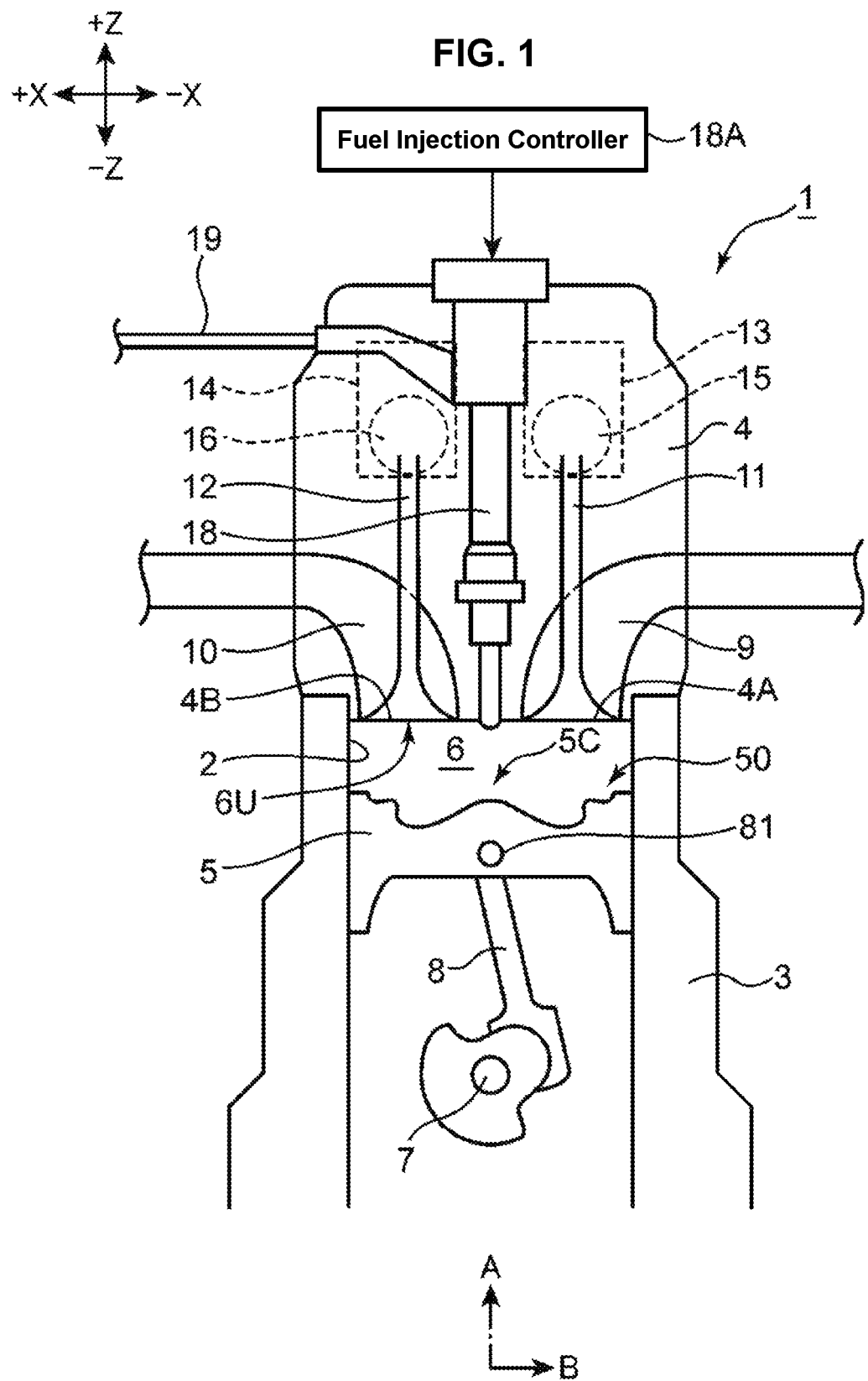
FIG. 1 is a schematic sectional diagram, in a cylinder-axis direction, of a diesel engine according to an embodiment of a compression ignition engine of the present invention.

Hereafter, a compression ignition engine according to an embodiment of the present invention will be described referring to the drawings. FIG. 1 is a schematic sectional diagram showing a direct-injection type diesel engine according to the embodiment of the compression ignition engine of the present invention. The diesel engine of the present embodiment includes a cylinder and a piston, which is a multi-cylinder engine which is installed to a vehicle as a power source for driving the vehicle, such as an automotive vehicle. The engine includes an engine body 1 and auxiliary elements assembled thereto, such as intake/exhaust manifolds and various pumps, not illustrated.

The engine body 1 comprises a cylinder block 3, a cylinder head 4, and a piston 5. The cylinder block 3 comprises plural cylinders and cylinder liners (hereafter, referred to as a "cylinder 2" simply, only one of these is illustrated in the figure) which are aligned in a direction perpendicular to a page of FIG. 1. The cylinder head 4 is attached to an upper surface of the cylinder block 3 so as to cover an upper opening of the cylinder 2. The piston 5 is accommodated in the cylinder 2 so as to slide reciprocatively, which is coupled to a crankshaft 7 via a connecting rod 8. The crankshaft 7 is rotated around its central axis according to a reciprocating motion of the piston 5. The structure of the piston 5 will be described specifically later.

A combustion chamber 6 is formed at an upper part of the piston 5. At the cylinder head 4 are formed an intake port 9 and an exhaust port 10 which respectively connect to the combustion chamber 6. A bottom surface of the cylinder head 4 is a combustion-chamber ceiling surface 6U, which is configured to have a flat shape extending in a horizontal direction. An intake-side opening portion 4A which is a downstream end of the intake port 9 and an exhaust-side opening portion 4B which is an upstream end of the exhaust port 10 are formed at the combustion-chamber ceiling surface 6U. An intake valve 1A to open/close the intake-side opening portion 4A and an exhaust valve 12 to open/close the exhaust-side opening portion 4B are assembled to the cylinder head 4.

The intake valve 11 and the exhaust valve 12 are a so-called poppet type. The intake valve 11 comprises an umbellar-shaped valve body to open/close the intake-side opening portion 4A and a stem which is provided to extend vertically from the valve body. Likewise, the exhaust valve 12 comprises an umbellar-shaped valve body to open/close the exhaust-side opening portion 4B and a stem which is provided to extend vertically from the valve body. Each of the valve bodies of the intake valve 11 and the exhaust valve 12 has a valve surface which is exposed to the combustion chamber 6.

In the present embodiment, a combustion-chamber wall surface which partitions the combustion chamber 6 comprises an inner wall surface of the cylinder 2, a crown surface 50 as an upper surface (+Z-side surface) of the piston 5, the combustion-chamber ceiling surface 6U (ceiling surface) which is a bottom surface of the cylinder head 4, and the respective valve surfaces of the intake valve 11 and the exhaust valve 12.

The cylinder head 4 is provided with an intake-side valve train (valve driving mechanism) 13 and an exhaust-side valve train (valve driving mechanism) 14 which drive the intake valve 11 and the exhaust valve 12, respectively. The intake valve 11 and the exhaust valve 12 are driven by these valve trains 13, 14 so as to be liked with a rotation of the crankshaft 7. According to the driving of the intake valve 11 and the exhaust valve 12, the valve body of the intake valve 11 opens/closes the intake-side opening portion 4A and the valve body of the exhaust valve 12 opens/closes the exhaust-side opening portion 4B.

An intake-side variable valve timing mechanism (intake-side VVT) 15 is installed to the intake-side valve train 13. The intake-side VVT 15 is an electric-type VVT which is provided at an intake camshaft, which is configured to change an opening/closing timing of the intake valve 11 by continuously changing a rotational phase of the intake camshaft to the crankshaft 7 within a specified angle range. Likewise, an exhaust-side variable valve timing mechanism (exhaust-side VVT) 16 is installed to the exhaust-side valve train 14. The exhaust-side VVT 16 is also an electric-type VVT which is provided at an exhaust camshaft, which is configured to change an opening/closing timing of the exhaust valve 12 by continuously changing a rotational phase of the exhaust camshaft to the crankshaft 7 within a specified angle range.

An injector 18 (fuel injector) to inject fuel into the combustion chamber 6 from its tip portion is attached to the cylinder head 4 (the combustion-chamber ceiling surface 6U) for each of the cylinders 2. A fuel supply pipe 19 is coupled to the injector 18. The injector 18 injects the fuel supplied through the fuel supply pipe 19 into the combustion chamber 6 directly. In the present embodiment, the injector 18 is assembled to the cylinder head 4 at a central portion, in a radial direction B, of the combustion chamber 6 so as to extend in a cylinder-axis direction A, and injects the fuel toward a cavity 5C (FIGS. 2A, 2B-4) which is formed at a crown surface 50 of the piston 5, which is will be described specifically. A specific structure of the injector 18 will be described later.

A high-pressure fuel pump (not illustrated) which is comprised of a plunger type pump linked with the crankshaft 7 and others is coupled to an upstream side of the fuel supply pipe 19. A common rail for pressure accumulation (not illustrated) which is common to all of the cylinders 2 is provided between the high-pressure fuel pump and the fuel supply pipe 19. The pressured fuel accumulated in this common rail is supplied to the injector 18 provided at each cylinder 2, so that the high-pressure fuel is injected into the combustion chamber 6 from each injector 18.

[Specific Structure of Piston]

Figure 2A:
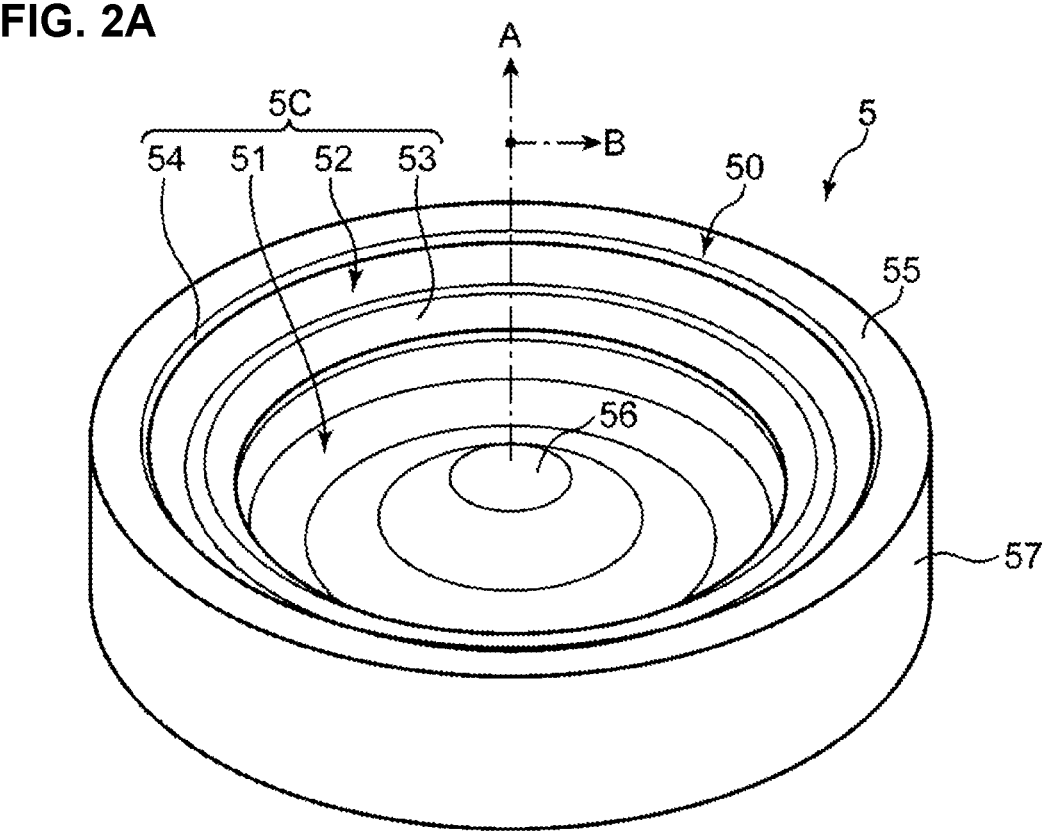
FIG. 2A is a perspective view of a crown portion of a piston of the diesel engine shown in FIG. 1.
Figure 2B:
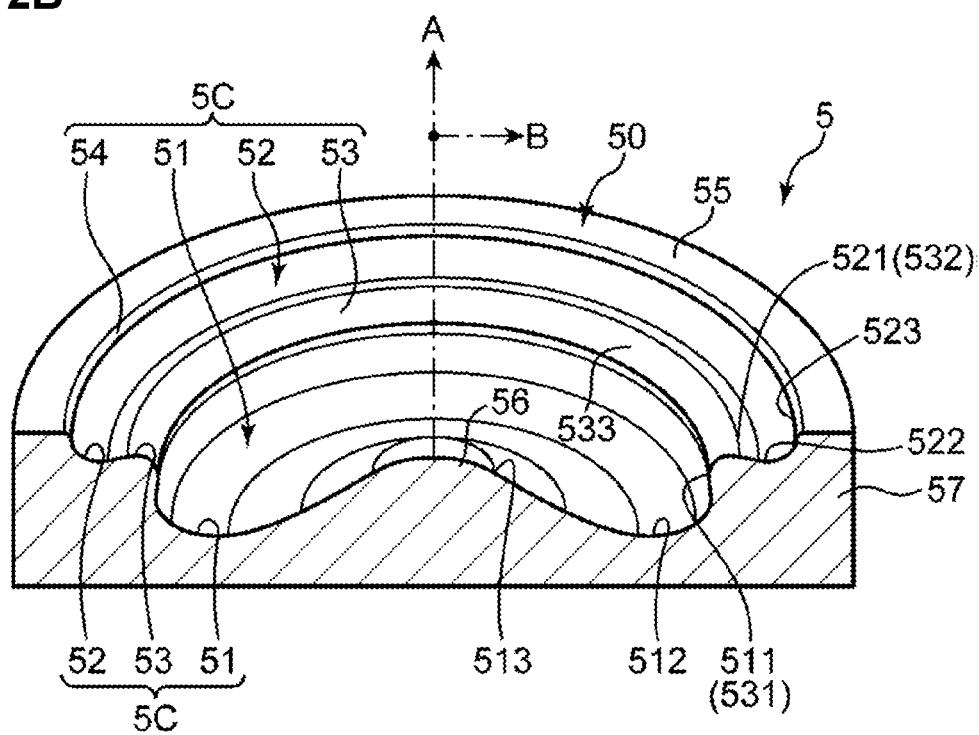
FIG. 2B is a perspective sectional view of the piston.
Figure 3:
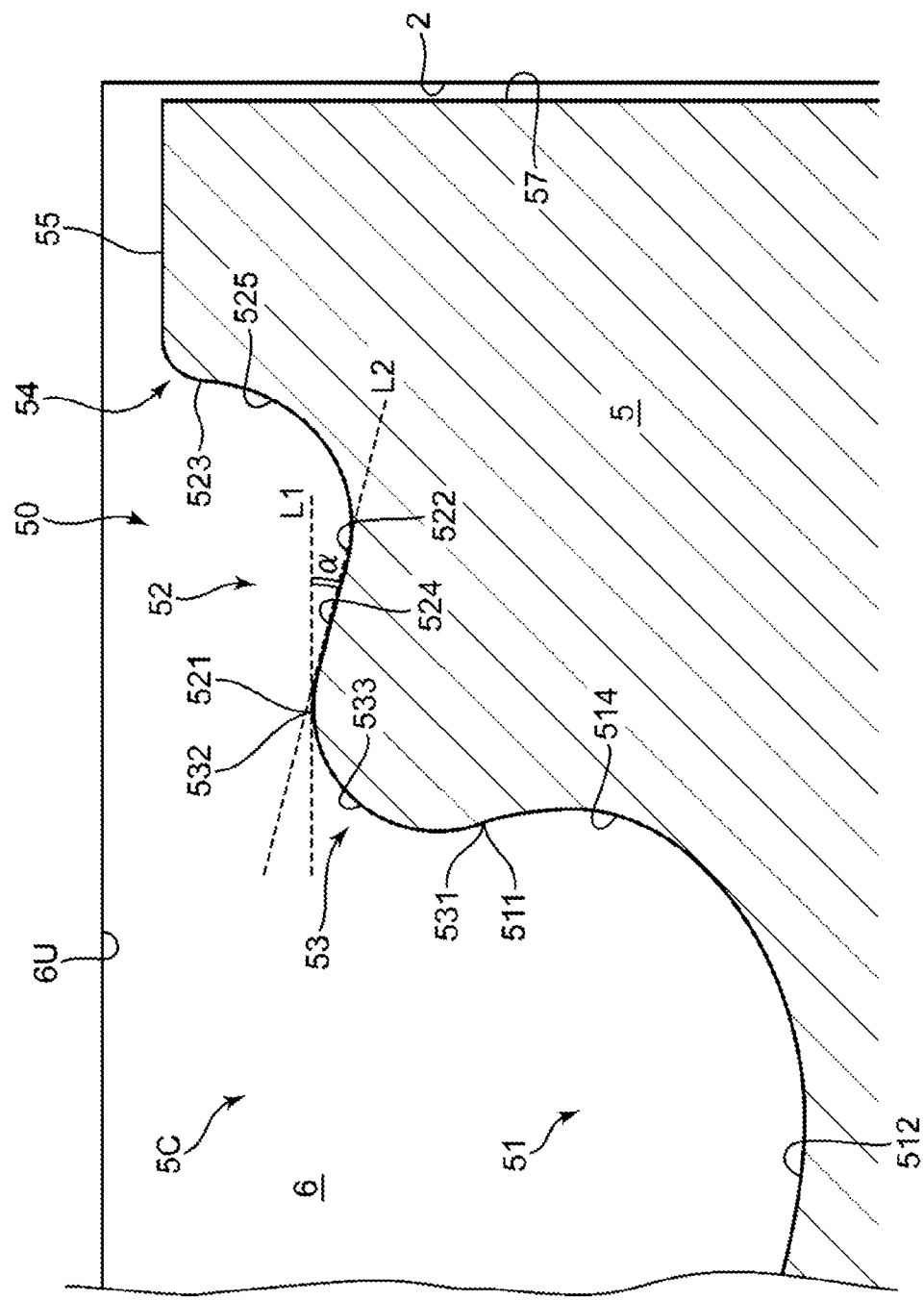
FIG. 3 is an enlarged view of a cross section of the piston shown in FIG. 2B.

Subsequently, a structure of the piston 5, in particular the crown surface 50, will be described specifically. FIG. 2A is a perspective view showing an upper part of the piston 5 primarily. The piston 5 comprises a piston head positioned at its upper side and a skirt portion positioned at its lower side, and FIG. 2A shows a portion of the piston head which has the crown surface 50 at its top. FIG. 2B is a perspective sectional view of the piston 5 along the radial direction. FIG. 3 is an enlarged view of the radial-direction cross section shown in FIG. 2B. In FIGS. 2A and 2B, the cylinder-axis direction A and the combustion-chamber radial direction B are shown by arrows.

The piston 5 includes the cavity 5C, a squish area 55, and a side peripheral surface 57. As described above, a part (bottom surface) of the combustion-chamber wall surface which partitions the combustion chamber 6 is formed by the crown surface 50 of the piston 5, and the cavity 5C is provided at the crown surface 50. The cavity 5C is a portion which is formed by configuring the crown surface 50 to be recessed downwardly in the cylinder-axis direction A, which receives the fuel injected from the injector 18. The squish area 55 is a ring-shaped flat surface portion which is positioned on an outward side, in the radial direction B, of the cavity 5C and at an area near an outer peripheral edge of the crown surface 50. The cavity 5C is provided at a central area, in the radial direction B, of the crown surface 50, excluding the squish area 55. The side peripheral surface 57 is a surface which slides the inner wall surface of the cylinder 2, which is provided with plural ring grooves where piston rings, not illustrated, are inserted.

Figure 7:
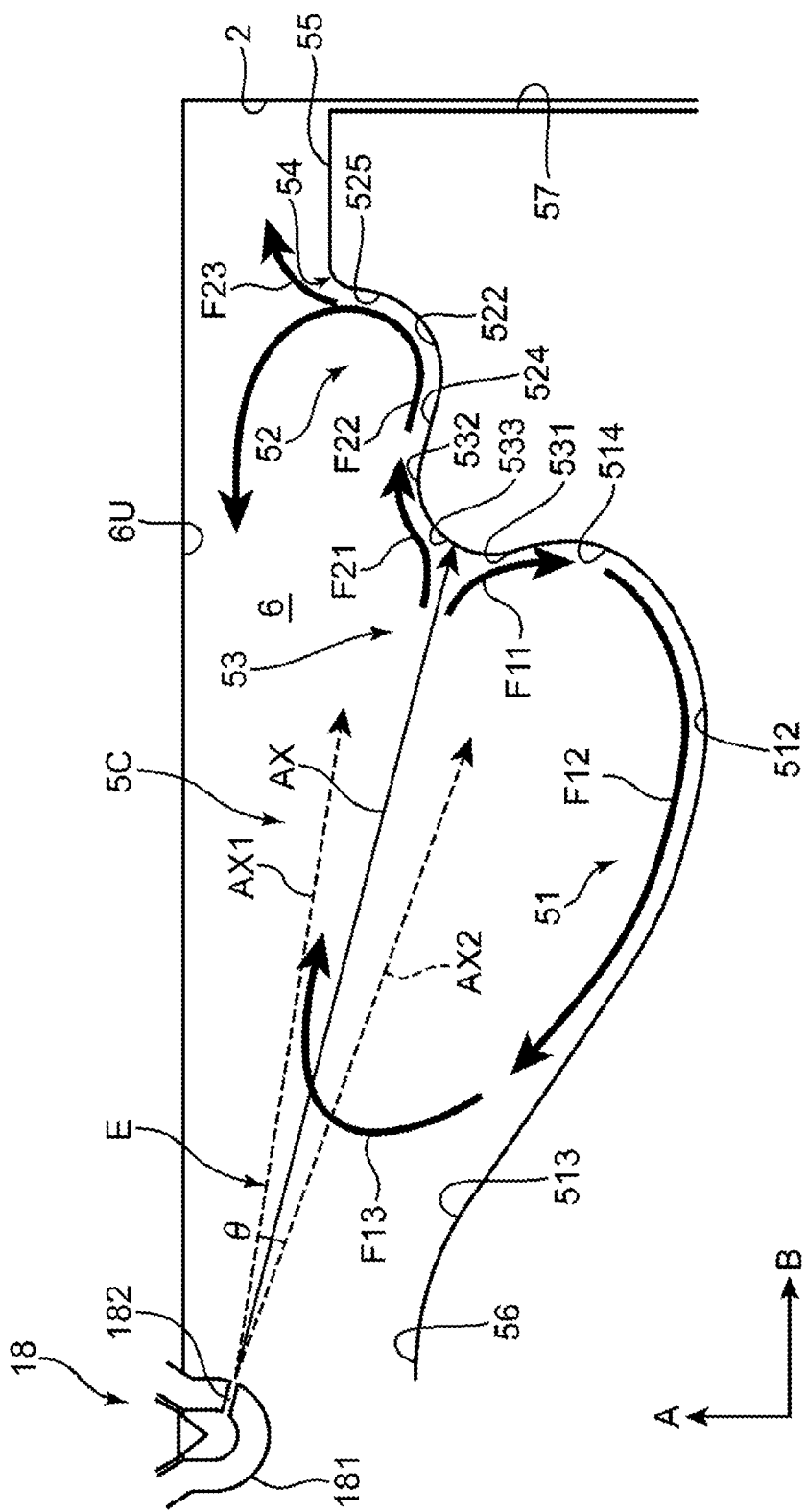
FIG. 7 is a sectional view of the piston, which shows a flow state of a fuel spray in the cavities in a case where a pre-injection is executed.

The cavity 5C includes a lower-side cavity 51, an upper-side cavity 52, a first lip 53, a second lip 54, and a mountain section 56. The lower-side cavity 51 is provided at the central area, in the radial direction B, of the crown surface 50 and configured to be recessed downwardly, in the cylinder-axis direction A, from the crown surface 50. The upper-side cavity 52 is configured to have a ring shape in a top view and be recessed downwardly, in the cylinder-axis direction A, from the crown surface 50. The lower-side cavity 51 is provided on the inward side, in the radial direction B, of the upper-side cavity 52. The first lip 53 is a portion which connects the lower-side cavity 51 and the upper-side cavity 52 in the radial direction B. The mountain section 56 is a mountain-shaped protrusion portion which is provided at a central position, in the radial direction B, of the crown surface 50 (the lower-side cavity 51). The mountain section 56 is configured to protrude upwardly at a position located right below a nozzle 181 of the injector 18 (FIG. 7).

The lower-side cavity 51 includes a first upper-end portion 511, a first bottom portion 512, and a first inner-end portion 513. The first upper-end portion 511 is located at the highest level at the lower-side cavity 51 and continuous to the first lip 53. The first bottom portion 512 is a ring-shaped area, in the top view, which is configured to be recessed downwardly the most in the lower-side cavity 51. The first bottom portion 512 is positioned near inside the first lip 53 in the radial direction B in the top view.

A radial-direction concaved portion 514 which is curved outwardly in the radial direction B is provided to connect the first upper-end portion 511 and the first bottom portion 512. This radial-direction concaved portion 514 includes a section which is concaved outwardly, in the radial direction B, from the first lip 53. The first inner-end portion 513 is located at the innermost position, in the radial direction, of the lower-side cavity 51, and continuous to a lower end of the mountain section 56. The first inner-end portion 513 and the first bottom portion 512 are connected by a gently-curved skirt-shaped surface.

The upper-side cavity 52 includes a second inner-end portion 521, a second bottom portion 522, a second upper-end portion 523, a slant flat surface 524, and a guide curved surface 525 (a first curved surface). The second inner-end portion 521 is located at the innermost position, in the radial direction B, of the upper-side cavity 52 and continuous to the first lip 53. The second bottom portion 522 is an area which is configured to be recessed downwardly the most in the upper-side cavity 52. Herein, the second bottom surface 522 has a shallower depth, in the cylinder-axis direction A, than the first bottom portion 512. That is, the upper-side cavity 52 is a recess portion which is located at a higher level than the lower-side cavity 51 in the cylinder-axis direction A. The second upper-end portion 523 is located at an upper end of the guide curved surface 525 and continuous to the squish area 55 via the second lip 54.

The slant flat surface 524 is a flat surface which extends from the second inner-end portion 521 which is a connection portion to the first lip 53 toward the second bottom portion 522, up to a starting point of the guide curved surface 525, so as to slant outwardly and downwardly. As shown in FIG. 3, the slant flat surface 524 is inclined along a slant line L2 which crosses a horizontal line L1 extending in the radial direction B by an inclination angle $\alpha$. The slant line L2 is configured such that an inclination thereof substantially matches an inclination of an injection-hole axis AX (FIG. 7) which corresponds to a fuel-injection direction of fuel injected from an injection hole 182 of the fuel injector 18. Herein, while it is not necessary to make the slant line L2 coincide with the injection-hole axis AX, by configuring the slant flat surface 524 to have substantially the same inclination as the injection-hole axis AX, a degree of interference with a flow of the fuel spray flowing into the upper-side cavity 52 becomes the minimum, so that the fuel spray can be made to flow smoothly.

The guide curved surface 525 is a wall surface which is configured to rise relatively-steeply on the outward side, in the radial direction B, of the second bottom portion 522. The guide curved surface 525 is a curved surface which extend upwardly in the cylinder-axis direction A, protruding outwardly in the radial direction B, in a section along the cylinder-axis direction A. The guide curved surface 525 is the curved surface which extends along a circumference of an imaginary circle with a specified radius, which will be specifically described later.

The first lip 53 is configured to protrude inwardly in the radial direction B at a position between the lower-side cavity 51 positioned at a lower level and the upper-side cavity 52 positioned at a higher level in the section along the cylinder-axis direction A. The first lip 53 is a curved surface which extends along a circumference of an imaginary circle with a specified radius as well. The first lip 53 comprises a lower end portion 531, a third upper-end portion 532 (an upper end portion in the cylinder-axis direction), and a central portion 533 which is located at a central position between these portions 531, 532. The lower end portion 531 is a connected section to the first upper-end portion 511 of the lower-side cavity 51. The third upper-end portion 532 is a connected section to the second inner-end portion 521 of the upper-side cavity 52.

In the cylinder-axis direction A, the lower end portion 531 is the lowermost portion of the first lip 53 and the third upper-end portion 532 is the uppermost portion of the first lip 53. The above-described slant flat surface 524 is also an area extending from the third upper-end portion 532 to the second bottom portion 522. The second bottom portion 522 is located at a lower level than the third upper-end portion 532. That is, the upper-side cavity 52 of the present embodiment does not have any bottom surface extending horizontally outwardly, in the radial direction B, from the third upper-end portion 532, in other words, there is no horizontal surface extending from the third upper-end portion 532 to the squish area 55, but the upper-side cavity 52 has the second bottom portion 522 recessed downwardly from the third upper-end portion 532.

The second lip 54 connects the second upper-end portion 523 of the upper-side cavity 52 and an inner peripheral edge 551 of the squish area 55 in the radial direction B. The second lip 54 is configured to have a convex-shaped curved surface protruding inwardly in the radial direction B between the upwardly-curved guide surface 525 and the horizontal squish area 55 in the section along the cylinder-axis direction A. The second lip 54 is a curved surface which extends along a circumference of an imaginary circle with a specified radius as well.

The mountain section 56 which protrudes upwardly has its height equal to the height of the third upper-end portion 532 of the first lip 53, and the mountain section 56 is located at the level lower than the squish area 55. The mountain section 56 is positioned at a center of the lower-side cavity 51 having a circular shape in the top view, so that the lower-side cavity 51 is configured to be a ring-shaped groove part surrounding the mountain section 56.

[Curved-Surface Shapes of Cavity Sections]

Figure 4:
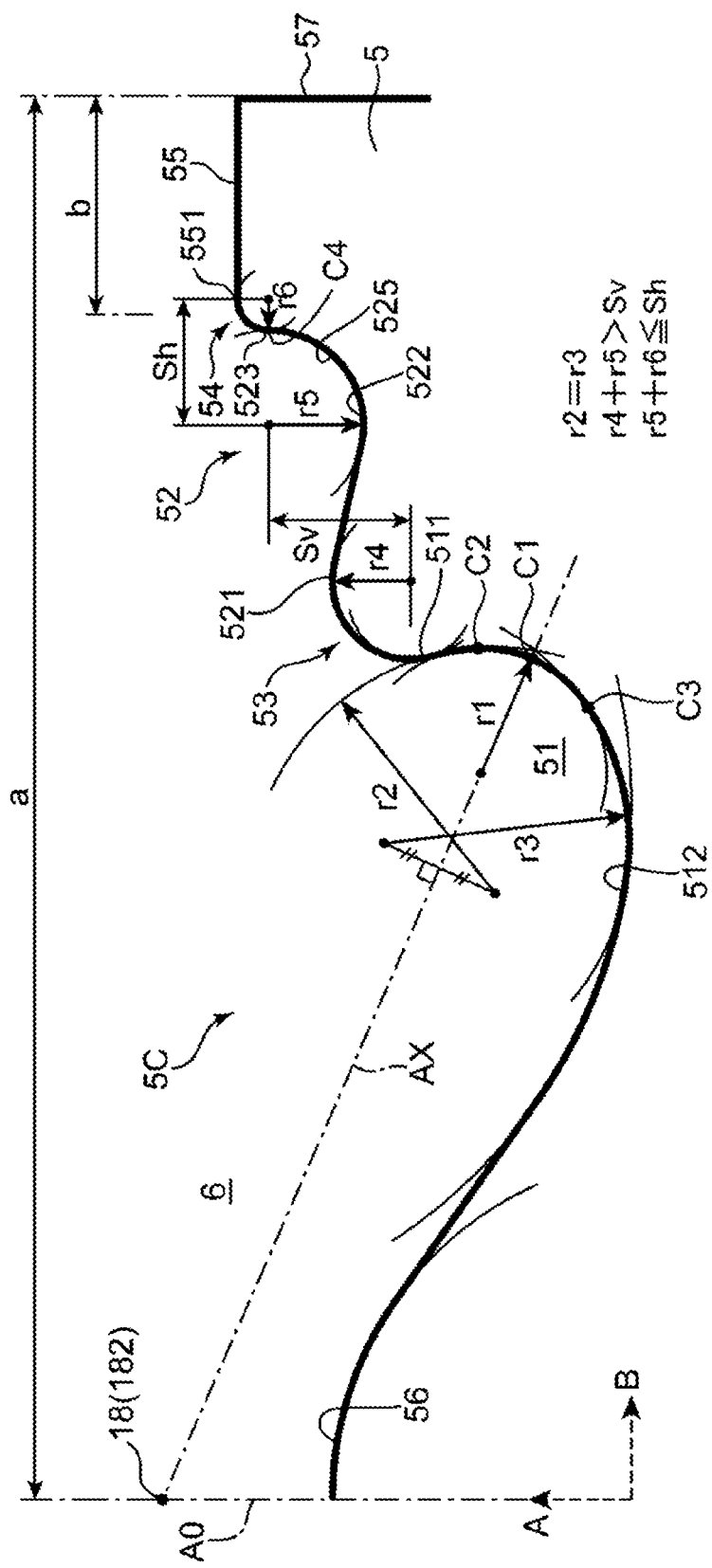
FIG. 4 is a diagram for explaining respective curved-surface shapes of upper-side and lower-side cavities and lips.

FIG. 4 is a sectional view along the cylinder-axis direction A for explaining respective curved-surface shapes of the lower-side cavity 51, the upper-side cavity 52, the first lip 53, and the second lip 54. The lower-side cavity 51 has a surface shape corresponding to a curved shape of a Cartesian oval (hereafter, referred to as an "egg shape") in the cross section including the cylinder axis. Specifically, the lower-side cavity 51 includes a first part C1 farthest from the injection hole 182 of the injector 18 and having an arc shape, a second part C2 which is located between the first part C1 and the first lip 53, and a third part C3 which extends inwardly, in the radial direction B, from the first part C1. Referring to FIG. 3 as well, the first part C1 corresponds to a central area of the radial-direction concaved portion 514, the second part C2 corresponds to an area extending from the radial-direction concaved portion 514 to the first upper-end portion 511, and the third part C3 corresponds to the an area extending from the radial-direction concaved portion 514 to the first bottom portion 512.

FIG. 4 shows a state where an injection-hole axis AX of the fuel injected from the injection hole 182 crosses the first part C1 farthest from the injector 18. The "egg shape" of the lower-side cavity 51 is an arc shape in which a radius r1 of the first part C1 is the smallest, and a radius of a curved part extending from the first part C1 to the second part C2 and a radius of a curved part extending from the first part C1 to the third part C3 respectively become gradually larger.

That is, a radius r2 of the second part C2 becomes larger as it goes away from the first part C1 in a counterclockwise direction in the cross section of FIG. 4. Further, a radius r3 of the third part C3 becomes larger at the same rate as the radius r2 of the second part C2 as it goes away from the first part C1 in a clockwise direction (r2=r3). The "egg shape" having its starting point at the first lip 53 has an arch shape in which a radius of an arc part extending from the second part C2 to the first part C1 becomes smaller and a radius of an arc part extending from the first part C1 to the third part C3 becomes larger.

The first lip 53 has a convex-shaped curved surface (a second curved surface) with a specified radius r4 which extends from the lower-end portion 531 (the first upper-end portion 511) to the third upper-end portion 532 (the second inner-end portion 521). The upper-side cavity 52 has a recess-shaped curved surface (a first curved surface) with a specified radius r5 (a radius R1 of a first imaginary circle) which extends from the second bottom portion 522 to the guide curved surface 525. The second lip 54 has a convex-shaped curved surface (a third curved surface) with a radius r6 (a radius R2 of a third imaginary circle). When a distance, in the cylinder-axis direction A, between a central point of the radius r4 and a central point of the radius r5 is defined as a first distance Sv and a distance, in the radial direction B, between a central point of the radius r5 and a central point of the radius r6 is defined as a second distance Sh, respective numerical values of the radiuses r4, r5, and r6 are selected so as to meet the following expressions.

$r4+r5>Sv$ $r5+r6 \leq Sh$ (herein, including $r6=0$)

Especially, it is preferable that the relationship expressed by r5+r6=Sh (herein, including r6=0) be satisfied. In this case, a line of Sh and the squish area 55 becomes parallel to each other in the section along the cylinder-axis direction A. Herein, the second lip 54 does not protrude inwardly, in the radial direction, beyond the guide curved surface 525, or the guide curved surface 525 does not become a curved surface which does not rise sufficiently upwardly in the cylinder-axis direction A. Accordingly, it is likely that the fuel spray is uniformly distributed to the both spaces above the upper-side cavity 52 and the squish area 55.

In the upper-side cavity 52, a part extending from the second bottom portion 522 to an upper-end part C4 of the guide curved surface 525 is formed by a nearly ¼ circle having the radius r5. The upper-end part C4 of the guide curved surface 525 is continuous to a lower-end position of the second upper-end portion 523 which is formed by a nearly ¼ circle having the radius r6. Herein, an upper end of the second upper-end portion 523 is continuous to the squish area 55.

According to the above-described curved-surface shape, a lower part of the guide curved surface 525 is positioned on the inward side, in the radial direction B, of the upper-end part C4 of the guide curved surface 525. That is, the guide curved surface 525 does not have any portion which is concaved outwardly in the radial direction B like the radial-direction concaved portion 514 of the lower-side cavity 51. The reason why the guide curved surface 525 has the above-described arc shape is that the guide curved surface 525 works with the above-described "egg shape" of the lower-side cavity 51 so that the air-fuel mixture can be prevented from excessively returning inwardly in the radial direction B in the combustion chamber 6 and a space (a space SP2) above the squish area 55 positioned on the outward side, in the radial direction B, of the guide curved surface 525 can be effectively utilized for appropriate combustion of the air-fuel mixture, which will be described later specifically.

The squish area 55 is a flat surface extending in a direction perpendicular to the cylinder axis A0 (in the radial direction B). In the present embodiment, an area which the squish area 55 occupies at the crown surface 50 of the piston 5 is relatively narrow. Specifically, as shown in FIG. 4, a radius a of the piston 5 and a width b, in the radial direction, of the squish area 55 are set such that a ratio a/b of the radius a to the width b falls within a range of 8-4. Even if the ratio a/b falls within this range, the oxygen existing in the space above the squish area 55 can be effectively utilized and the fuel spray can be prevented from adhering to the cylinder liner by the performance of the guide curved surface 525 which will be described later.

[Fuel Injection Pattern]

Execution of fuel injection by the injector 18 is controlled by a fuel injection controller 18A (see FIG. 1). The fuel injection controller 18A is configured to change a fuel injection pattern based on a map which is preset in accordance with an engine load, an engine speed, and so on.

Figure 5:
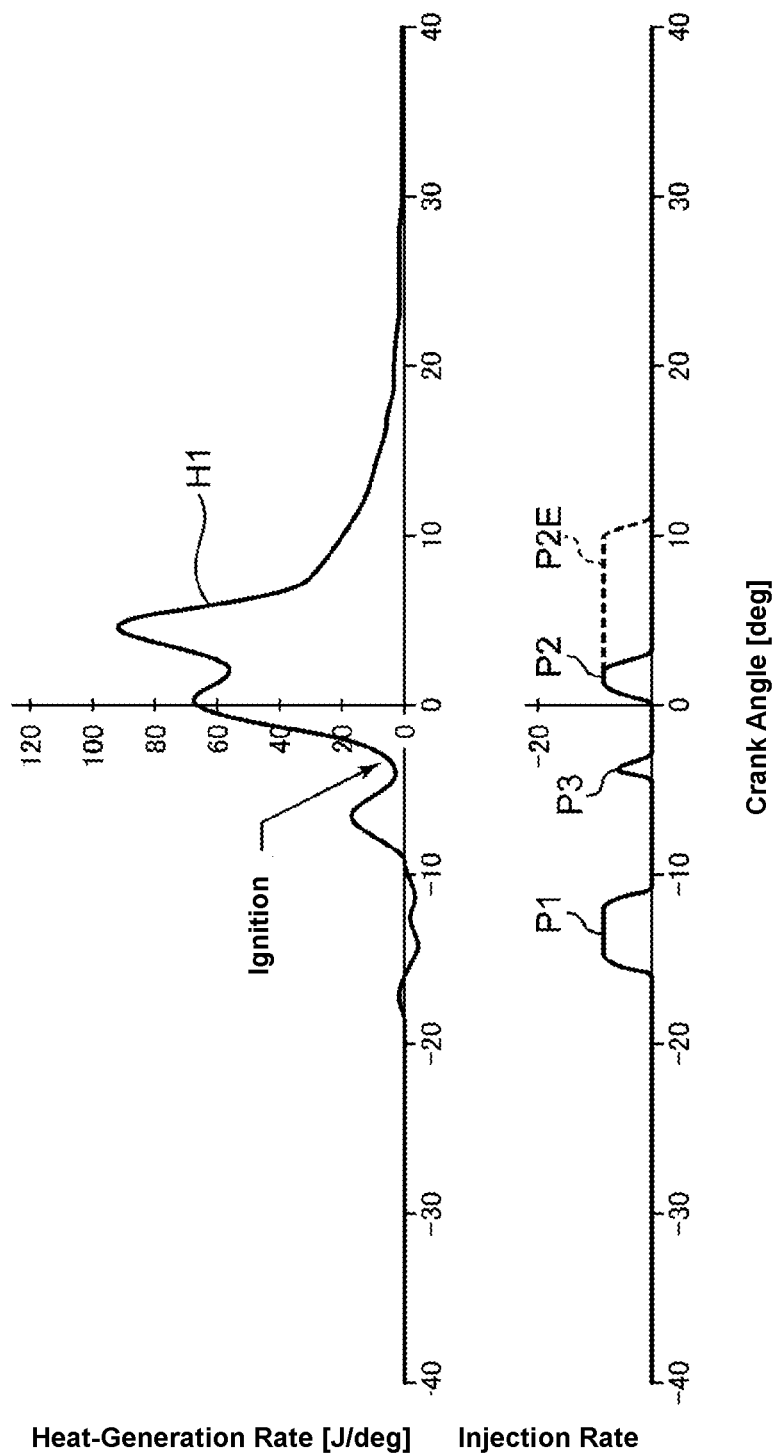
FIG. 5 is time charts showing a fuel injection timing and a heat generation rate at a low-load or middle-load operation of an engine.

FIG. 5 is time charts showing the fuel injection pattern which the fuel injection controller 18A makes the injector 18 execute and a heat-generation-rate characteristic H1 of the combustion executed by this fuel injection pattern at a low-load or middle-load operation of an engine. At the low-load or middle-load operation of the engine, the fuel injection controller 18A makes the injector 18 execute a pre-injection P1, a main-injection P2, and a middle-stage injection P3 per cycle.

The pre-injection P1 is the fuel injection which is executed when the piston 5 is positioned on an advanced side of the compression top dead center (TDC). The pre-injection P1 aims at premixed combustion of the injected fuel, which is executed in a later stage of a compression stroke where a cylinder-inside pressure and a cylinder-inside temperature become considerably high respectively. The main-injection P2 is executed on a delayed side of the pre-injection P1 and started during a period of the premixed combustion of the fuel injected by the pre-injection P1. That is, the main-injection P2 aims at diffusion combustion of the injected fuel by utilizing the heat of the premixed combustion, which is started when the piston 5 is positioned nearly at TDC. The middle-stage injection P3 is the fuel injection which is executed between the pre-injection P1 and the main-injection P2. It is intended that the fuel injected by the middle-stage injection P3 is burned during a period between the combustion of the pre-injection P1 and the combustion of the main-injection P2. The middle-stage injection P3 is substantially the diffusion combustion as well.

FIG. 5 shows an example where the pre-injection P1 is executed during of a period from the crank angle—CA 16 degrees to the crank angle—CA 12 degrees. The middle-stage injection P3 injects a smaller amount of fuel than the pre-injection P1 and the main-injection P2. FIG. 5 shows an example where the middle-stage injection P3 is started from the crank angle—CA 16 degrees. An injection period of the main-injection P2 changes depending on the engine load. That is, while an injection start timing of the main-injection P2 is around the TDC, an injection terminal timing is delayed more as the engine load increases. At the low-load or middle-load operation of the engine, when the engine load is relatively low, the injection period of the main-injection P2 is TDC—about the crank angle CA 3 degrees as shown by a solid line in FIG. 5. Meanwhile, when the engine load is relatively high, the injection period of the main-injection P2 is TDC—exceeding the crank angle CA 10 degrees as shown by a dotted line in FIG. 5. In this case, the fuel spray of the pre-injection P1 and the fuel spray of a latter half of a main-injection P2E flow into the upper-side cavity 52.

The heat-generation-rate characteristic H1 shown in FIG. 5 is a characteristic of the heat generation caused by the respective combustions of the main-injection P2 and the middle-stage injection P3. The heat-generation-rate characteristic H1 has a front-stage mountain part which is caused by the premixed combustion of the pre-injection P1, a late-stage mountain part which is caused by the diffusion combustion of the main-injection P2, and a valley part between these two mountain parts. That is, there occur two-stage peaks of the heat generation rate which are caused by the respective combustions of the pre-injection P1 and the main-injection P2 which are executed at different injection timings, having a relatively large amount of injected fuel. The middle-stage injection P3 is the fuel injection to suppress the peaks of the heat generation rate caused by the respective combustions of the pre-injection P1 and the main-injection P2. The middle-stage injection P3 contributes to reduction of combustion noise because of this peak suppression. Herein, in a case where the main-injection P2E with the delayed injection terminal timing is adopted, the above-described late-stage mountain part occurs for a longer period.

Figure 6:
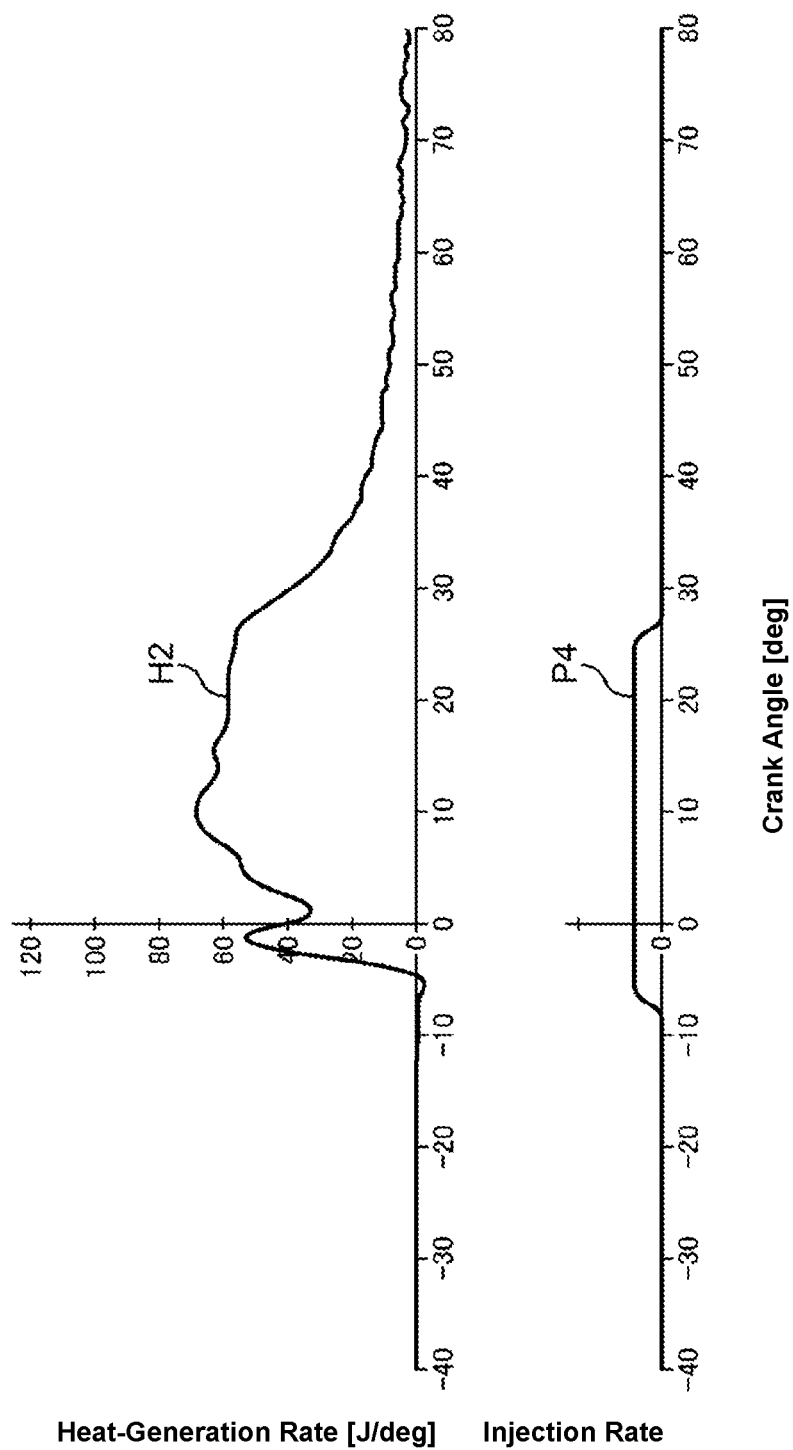
FIG. 6 is time charts showing the fuel injection timing and the heat generation rate at a high-load operation of the engine.

Next, FIG. 6 is time charts showing a fuel injection pattern which the fuel injection controller 18A makes the injector 18 to execute in a high-speed and high-load operation of the engine and a heat-generation-rate characteristic H2 which is caused by the execution of this fuel injection pattern. The fuel injection controller 18A makes the injector 18 execute a single injection P4 having a long injection period per cycle in the high-speed and high-load operation of the engine.

The single injection P4 is started at around the crank angle—CA 8 degrees and terminated at around the crank angle CA 27 degrees beyond TDC. This fuel injection period naturally becomes long in order to secure the fuel-injection amount for satisfying a torque demand of the high-load operation of the engine. That is, the fuel injection continues until a timing when the position lowers considerably in an expansion stroke. The heat-generation-rate characteristic H2 caused by the combustion of the single injection P4 shows the characteristic in which a single peak continues for a relatively long period as shown in FIG. 6.

[Flow of Fuel Spray]

Next, a flow state of the fuel spray in the combustion chamber 6 when the above-described fuel injection is executed will be described. FIG. 7 is a schematic sectional view of the combustion chamber 6, which shows the state of the fuel injection from the injector 18 toward the cavity 5C and the flow of the air-fuel mixture after the fuel injection when the pre-injection P1 is executed. In FIG. 7, the injection-hole axis AX of the fuel spray E injected from the injector 18 and arrows F11, F12, F13, F21, F22 and F23 which schematically represent the flow of the air-fuel mixture after the fuel injection. The pre-injection P1 is executed toward the first lip 53. That is, the fuel injection controller 18A makes the injector 18 execute the pre-injection P1 at the timing when the first lip 53 of the piston 5 going up in the compression stroke and the injection-hole axis AX cross each other, and thereby the fuel spray E hits against the first lip 53.

FIG. 7 shows the state where the nozzle head 181 is disposed at a center of the combustion-chamber ceiling surface 6U and the fuel is injected from the single injection hole 182 among the plural injection holes provided at the nozzle head 181. The fuel injected from the injection hole 182 is sprayed along the injection-hole axis AX shown in this figure. The sprayed fuel spreads with a spray angle θ. In FIG. 7, an upper spreading axis AX1 which represents upward spreading relative to the injection-hole axis AX and a lower spreading axis AX2 which represents downward spreading relative to the injection-hole axis AX are shown. The spray angle θ is an angle which the upper spreading axis AX1 makes with the lower spreading axis AX2. That is, the fuel spray E injected along the injection-hole angle AX goes toward the first lip 53, spreading in the corn shape with the spray angle θ. The fuel spray E forms the air-fuel mixture together with the air in the combustion chamber 6, and then hits against the first lip 53.

The fuel spray E which has hit against the first lip 53 is divided into the one (the arrow F11) directed toward the lower-side cavity 51 (downwardly) and the other one (the arrow F21) directed toward the upper-side cavity 52 (upwardly). That is, the fuel injected toward the central portion 533 of the first lip 53 is divided vertically, and then these vertically-divided fuel come to flow along the respective surfaces of the cavities 51, 52, forming the air-fuel mixture together with the air existing in the cavities 51, 52.

Specifically, the air-fuel mixture flowing in the direction of the arrow F11 (downwardly) goes down into the radial-direction concaved portion 514 of the lower-side cavity 51 from the lower end portion 531 of the first lip 53 and flows in the downward direction. Then, this air-fuel mixture changes its flowing direction from the vertical direction to the inward direction in the radial direction B because of the curved-surface shape of the radial-direction concaved portion 514, and then flows along the bottom surface of the lower-side cavity 51 having the first bottom portion 512 as shown by the arrow F12. In this case, the air-fuel mixture further mixes with the air of the lower-side cavity 51, thereby diluting its concentration. The bottom surface of the lower-side cavity 51 is configured to protrude upwardly toward a center, in the radial direction, of the bottom surface of the lower-side cavity 51 due to existence of the mountain section 56. Accordingly, the air-fuel mixture flowing in the arrow F12 direction is raised upward, and finally flows toward the outward side, in the radial direction, from the combustion-chamber ceiling surface 6U as shown by the arrow F13. In this case, the air-fuel mixture further mixes with the air remaining in the combustion chamber 6 of the lower-side cavity 51, thereby diluting its concentration so as to become the homogeneous and thin mixture.

Meanwhile, the air-fuel mixture flowing in the direction of the arrow F12 (upwardly) goes down into the slant flat surface 524 of the upper-side cavity 52 from the upper end portion 532 of the first lip 53 and flows obliquely downwardly along an inclination of the slant flat surface 524. Then, this air-fuel mixture reaches the second bottom portion 522 as shown by the arrow F22. Herein, the slant flat surface 524 is a surface having the inclination along the injection-hole axis AX. Therefore, the air-fuel mixture can smoothly flow outwardly in the radial direction. That is, the air-fuel mixture can reach an outwardly-deep position in the combustion chamber 6 because of respective existences of the slant flat surface 524 and the second bottom portion 522 positioned at the lower level than the third upper-end portion 532 of the first lip 53.

After this, the above-described air-fuel mixture is raised upwardly from a rising curved surface positioned between the second bottom portion 522 and the guide curved surface 525, and then flows toward the inward side in the radial direction from the combustion-chamber ceiling surface 6U. In the process of the flow shown by the arrow F22, the air-fuel mixture further mixes with the air existing in the upper-side cavity 52 and becomes the homogeneous and lean mixture. Herein, since the guide curved surface 525 extending nearly in the vertical direction exists on the outward side, in the radial direction, of the secant bottom portion 522, it is prevented that the injected fuel (the air-fuel mixture) reaches the inner wall surface of the cylinder 2 (in general, a cylinder liner, not illustrated, exists). That is, the above-described air-fuel mixture is possibly made to flow up to a position near the outward side, in the radial direction, of the combustion chamber 6 by the second bottom portion 522, but it can be suppressed by the guide curved surface 525 that this mixture interferes with the inner peripheral wall of the cylinder 2. Thereby, any improper cooling loss caused by the above-described interference can be properly suppressed.

Herein, the lower part of the guide curved surface 525 is configured to be positioned on the inward side, in the radial direction B, of the upper end of the guide curved surface 525. In other words, the second lip 54 does not protrude inwardly in the radial direction B relative to the guide curved surface 525. Accordingly, the flow shown by the arrow F22 does not become excessively strong, so that a flow going outwardly in the radial direction B which is shown by the arrow F23 is generated as well. Accordingly, the appropriate burning of the air-fuel mixture can be attained by effectively utilizing a space located on the outward side, in the radial direction, of the guide curved surface 525 (i.e., a space on the squish area 55). Thereby, generation of the soot and the like is so suppressed that the burning (combustion) utilizing a whole part of the space in the combustion chamber can be attained.

Figure 8:
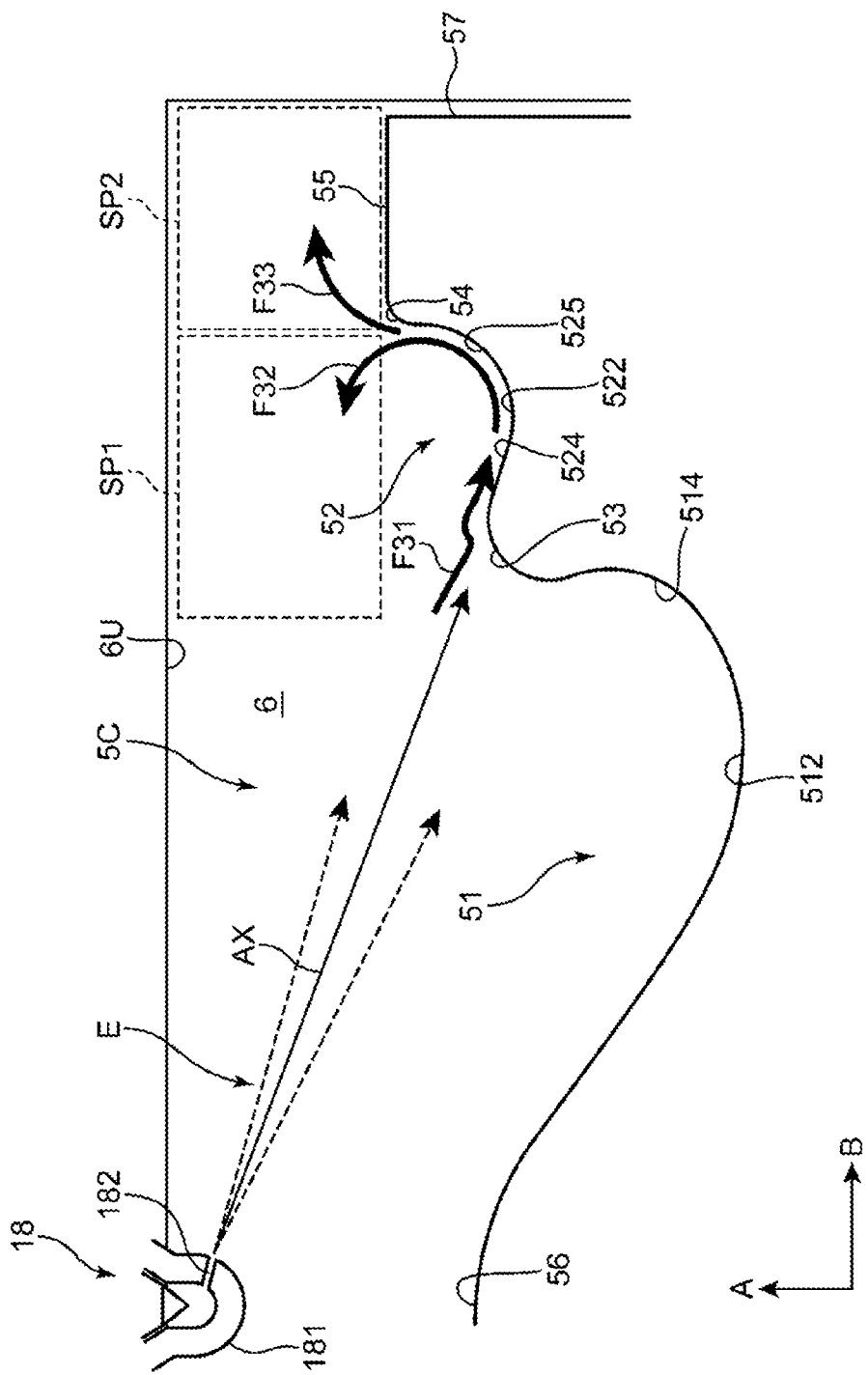
FIG. 8 is a sectional view of the piston, which shows the flow state of the fuel spray in the cavities in a case where an injection is executed when the piston lowers.

Next, FIG. 8 shows a fuel spray state from the injector 18 to the cavity 5C and the flow state of the air-fuel mixture when the min-injection P2E having the relatively long injection period (FIG. 5) or the single injection P4 (FIG. 6) are executed, and flows after these injections. The piston 5 has a considerably lower position in a late stage of the main-injection P2E or the single injection P4. Accordingly, the injection-hole axis AX of the fuel spray E comes to be directed toward a range from the vicinity of the upper end of the first lip 53 to the second bottom surface 522 of the upper-side cavity 52.

Accordingly, the fuel spray E goes toward the upper-side cavity 52 from the first lip 53 as shown by an arrow F31, forming the air-fuel mixture. Then, similarly to the above-described state, the air-fuel mixture flows into the slant flat surface 524 of the upper-side cavity 52 and goes obliquely downwardly along the inclination of the slant flat surface 524. Then, as shown by an arrow F32, the air-fuel mixture is raised upwardly from the rising curved surface positioned between the second bottom portion 522 and the guide curved surface 525, and then flows toward the inward side in the radial direction from the combustion-chamber ceiling surface 6U. After this, the air-fuel mixture is divided into the one directed toward the inward side in the radial direction B which is shown by an arrow F32 and the other one directed toward the outward side in the radial direction B which is shown by an arrow F33.

The air-fuel mixture flowing in the direction of the arrow F32 flows into a space SP1 above the upper-side cavity 52. Further, the air-fuel mixture flowing in the direction of the arrow F33 flows into the space SP2 above the squish area 55. The oxygen existing in the lower-side cavity 51 is mostly used up by the combustion of the pre-injection P1 or the combustion of a front-half part of the single injection P4. Meanwhile, the oxygen still remains in the space SP1 above the upper-side cavity 52 and the space SP2 above the squish area 55. Therefore, it is preferable that the remaining oxygen in these spaces SP1, SP2 be effectively utilized in the combustion of the main-injection P2E or a latter-half part of the single injection P4.

In order to achieve this, it is important that the air-fuel mixture (fuel spray E) is appropriately distributed to the space SP1 above the upper-side cavity 52 and the space SP2 above the squish area 55. The present embodiment takes some measures against the respective shapes of the upper-side cavity 52, the first lip 53 and the second lip 54 so that the air-fuel mixture can be introduced into these spaces SP1, SP2 uniformly. Hereafter, the measures will be specifically described.

[Feature of Shape of Cavity]

Figure 9:
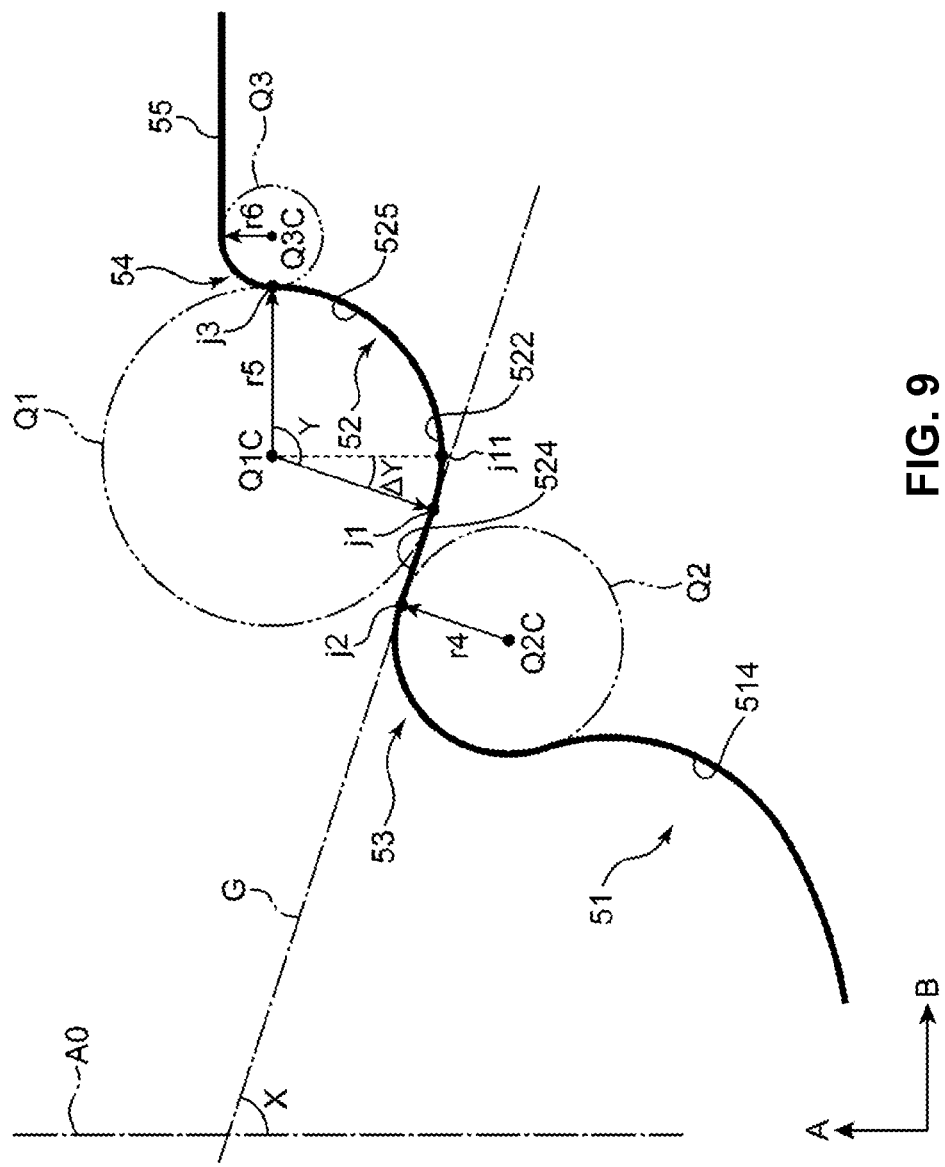
FIG. 9 is a schematic diagram explaining a curved-surface shape of the upper-side cavity.

FIG. 9 is a schematic view of a cross section of the piston 5 taken along the cylinder axis A0, which explains the shape of the respective curved surfaces of the upper-side cavity 52, the first lip 53, and the second lip 54. The guide curved surface 525 (the first curved surface) of the upper-side cavity 52 is, as described above referring to FIG. 4, the curved surface which extends along a circumference of a first imaginary circle Q1 having the specified radius r5 in the section along the cylinder axis A0. That is, the guide curved surface 525 has a curved-surface shape which matches (coincides with) a part of the circumference of the first imaginary circle Q1. Further, in the section along the cylinder axis A0, the first lip 53 (the second curved surface) has a curved surface extending along a circumference of a second imaginary circle Q2 having the specified radius r4 which is smaller than the radius r5, and the second lip 54 (the third curved surface) has a curved surface extending along a circumference of a third imaginary circle Q3 having the specified radius r6 which is smaller than the radius r4. That is, the first and second lips 53, 54 respectively have the curved-surface shapes matching (coinciding with) the parts of the respective circumferences of the second and third imaginary circles Q2, Q3.

Herein, a common tangential line G which is interposed between a center point Q1C of the first imaginary circle Q1 and a center point Q2C of the second imaginary circle Q2 and configured such that a contact point j2 with the second imaginary circle Q2 is positioned on the inward side, in the radial direction, of a contact point j1 with the first imaginary circle Q1 will be focused on. As described above, the upper-side cavity 52 is positioned on the outward side, in the radial direction B, of the first lip 53, and the second bottom surface 522 is located at a downwardly-recced level than the first lip 53. Accordingly, the first imaginary circle Q1 is positioned on the outward side, in the radial direction B, of the second imaginary circle Q2, and an uppermost part of the second imaginary circle Q2 is located at a higher level than a lowermost part of the first imaginary circle Q1. Therefore, the common tangential line G is a tangential line which crosses the cylinder axis A0 and lowers outwardly in the radial direction B.

In the present embodiment, an angle X which the common tangential line G makes with the cylinder axis A0 is set within a range of 75 to 80 degrees ($75°<X<80°$). This angle X substantially matches (coincides with) an angle (corn angle) which the injection-hole axis AX of the injector 18 (FIG. 7) makes with the cylinder axis A0. The slant flat surface 524 is a flat surface extending between the contact point j1 and the contact point j2 along the common tangential line G. By setting the angle X within the above-described range, the slant flat surface 524 can be the flat surface having the inclination which substantially matches (coincides with) the inclination of the injection-hole axis AX. Thereby, the fuel spray can be made to flow into the upper-side cavity 52 smoothly.

<First Curved Surface>

The starting point of the guide curved surface 525 (the first curved surface) which is positioned at an inward end portion, in the radial direction, of the guide curved surface 525 is a connection point to a lower end of the slant flat surface 524. This starting point is an inflexion point where a linear lowering line of the slant flat surface 524 changes to a curved surface extending along the first imaginary circle Q1. This starting point substantially coincides with the position of the contact point j1. Meanwhile, a terminal point of the guide curved surface 525 which is positioned at an outward end portion, in the radial direction, of the guide curved surface 525 is a connection point j3 to the second lip 54. This connection point j3 is also an inflexion point where a curve direction changes. Herein, an angle which is made between a line connecting the center point Q1C of the first imaginary circle Q1 and the above-described starting point and another line connecting the center point Q1C of the first imaginary circle Q1 and the above-described terminal point is defined as an angle Y of the guide curved surface 525 which occupies at the circumference of the first imaginary circle Q1. In the present embodiment, this angle Y is set within a range of 80 to (180–the angle X) degrees (i.e., $80°<Y<(180°−X)$).

By setting the angle Y of the guide curved surface 525 to be larger than 80°, the fuel spray introduced into the upper-side cavity 52 can be guided by this guide curved surface 525 so as to be introduced into the space SP1 above the upper-side cavity 52 (FIG. 8). Further, by setting the angle Y to be smaller than ($180°−X$), the fuel spray is not excessively introduced into the space SP1 above the upper-side cavity 52 and also appropriately introduced into the space SP2 above the squish area 55. Accordingly, the combustion effectively utilizing the oxygen existing in both of the spaces SP1, SP2 can be achieved.

Figure 10:
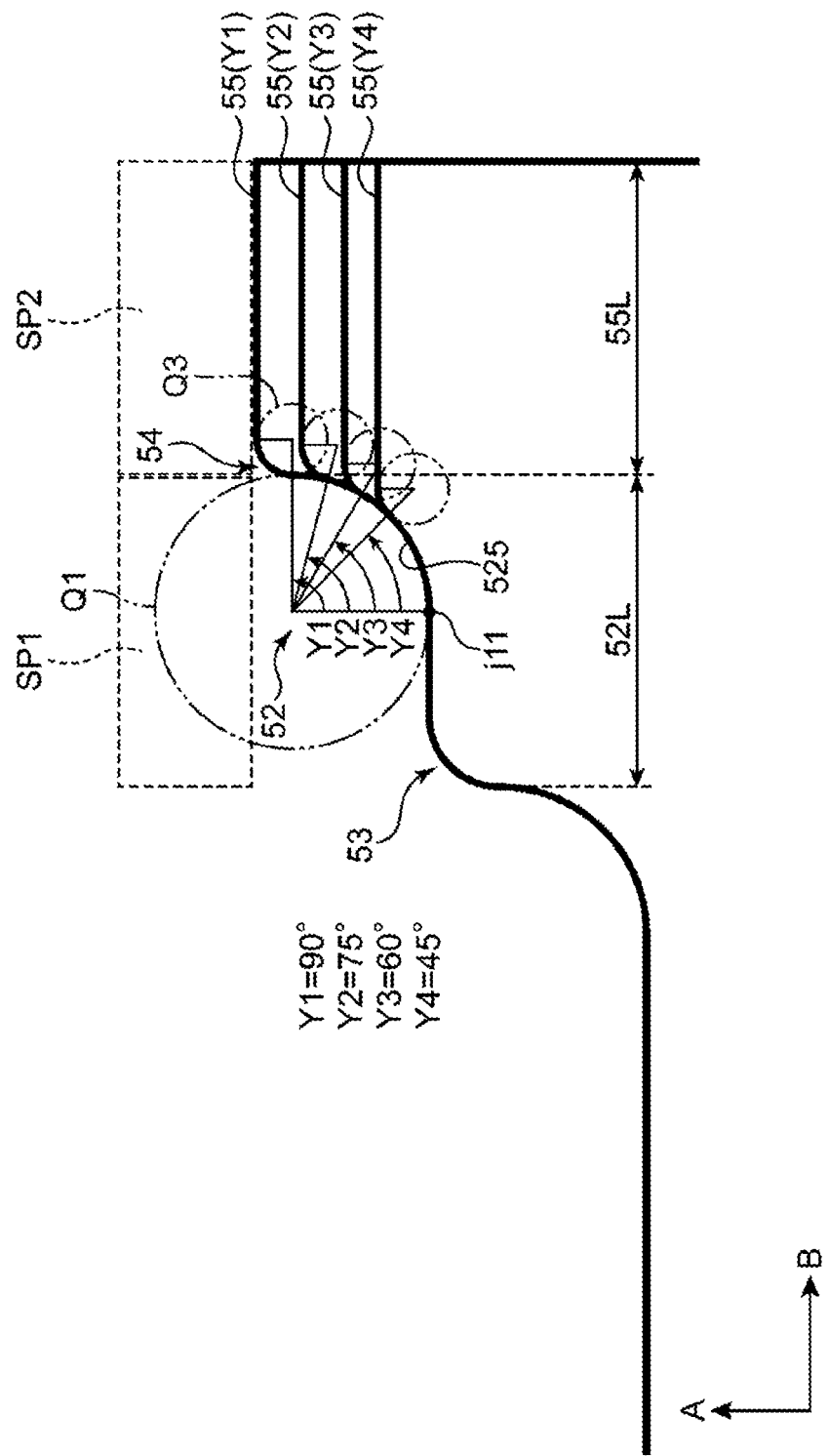
FIG. 10 is an explanatory diagram of an angle Y of the curved surface of the upper-side cavity which occupies at an imaginary circle.

A basis of setting the angle Y as described above will be described referring to FIGS. 10 and 11. FIG. 10 is an explanatory diagram showing a state where it is assumed that the slant flat surface 524 of the upper-side cavity 52 has a horizontal surface with no inclination, and the angle of the guide curved surface 525 which occupies at the first imaginary circle Q1 is changed in the range of Y1-Y4. Herein, these angles are set such that Y1=90°, Y2=75°, Y3=60°, and Y4=45°. The smaller the angle occupying at the first imaginary circle Q1 is, the lower the level (height position) of the squish area 55 is. In FIG. 10, the levels (height positions) of the squish area 55 in the cases where the guide curved surface 525 is set by the angles Y1-Y4 are shown by 55 (Y1)-55 (Y4), respectively.

In the present embodiment, an upper-side-cavity length 52L which is a radial-direction length of the upper-side cavity 52 and a squish-area length 55L which is a radial-direction length of the squish area 55 are identical. Herein, "being identical" includes not only being perfectly identical but being substantially identical. For example, even if there is a slight difference of nearly 10-15% between them, this should be covered by a concept of the above-described "being identical."

Figure 11:
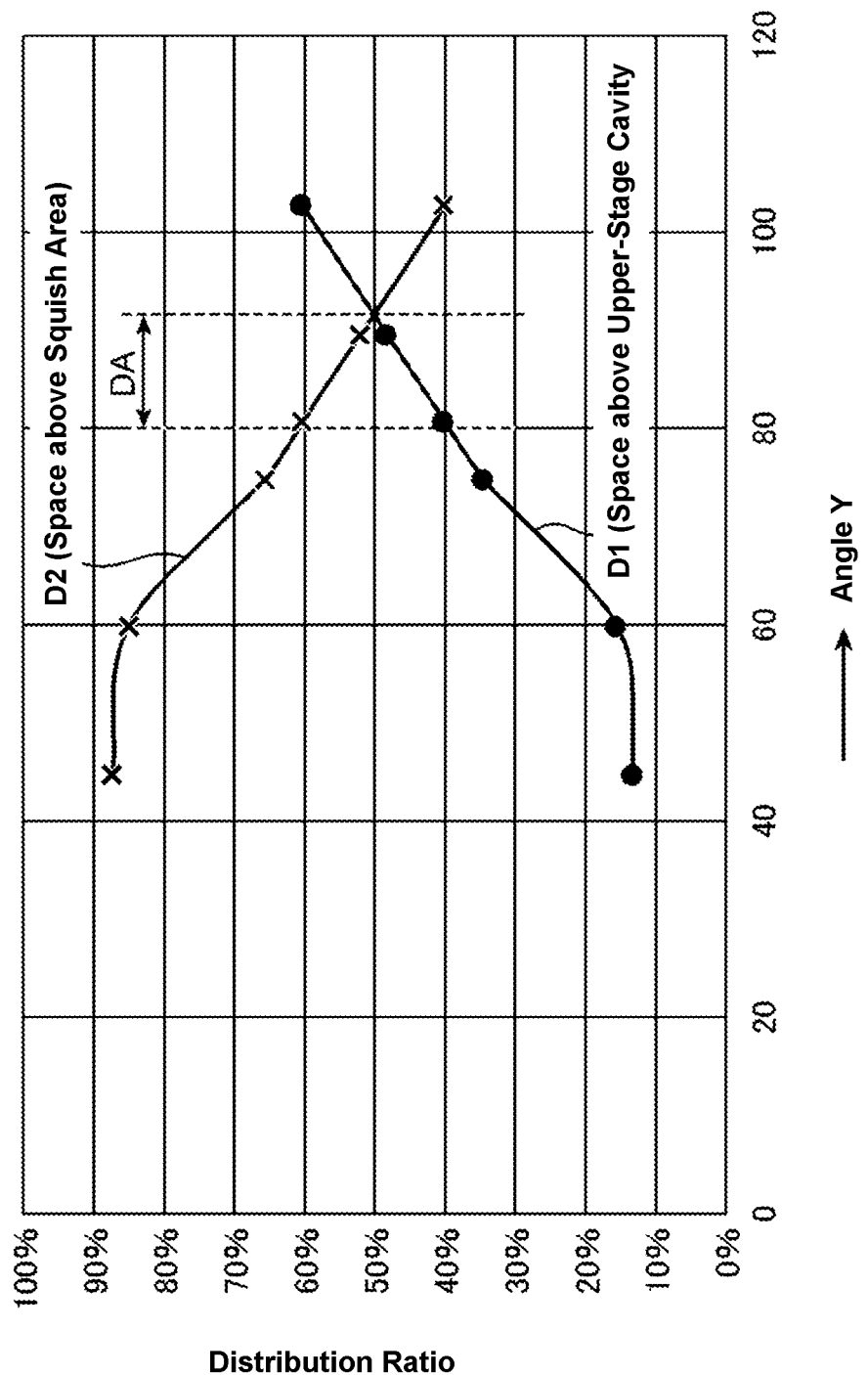
FIG. 11 is a graph showing relationships between the angle Y and respective distribution states of the fuel spray in respective spaces above a squish area and the upper-side cavity.

FIG. 11 is a graph showing analysis results of respective distribution states of the fuel sprays to the space SP1 above the upper-side cavity 52 and the space SP2 above the squish area 55 in the cases where the angle of the guide curved surface 525 is changed in the range of Y1-Y4 as shown in FIG. 10. A lateral axis of this graph represents the angle Y and a vertical axis of this graph represents a distribution ratio of the fuel spray, that is—how the fuel spray guided upwardly in the cylinder-axis direction A by the guide curved surface 525 of the upper-side cavity 52 is distributed to the two spaces SP1, SP2, respectively. A curve D1 shows the distribution ratio to the space SP1 above the upper-side cavity 52, and a curve D2 shows the distribution ratio to the space SP2 above the squish area 55. In FIG. 11, the angles Y=80°, 105° are also plotted, which are not exemplified in FIG. 10.

As shown by the curve D1 of FIG. 11, the larger the angle Y is, the higher the distribution ratio of the fuel spray flowing into the space SP1 above the upper-side cavity 52 is. Meanwhile, as shown by the curve D2, the larger the angle Y is, the lower the distribution ratio of the fuel spray flowing into the space SP2 above the squish area 55 is. This is because a rising degree of the guide curved surface 525 relative to the cylinder-axis direction A increases as the angle Y becomes larger (e.g., see 55 (Y1) of FIG. 10), so that it is likely that the fuel spray is guided toward the combustion-chamber ceiling surface 6U or the inward side, in the radial direction B, of the combustion chamber 6. To the contrary, this is because the guide curved surface 525 becomes a gentler slope as the angle Y becomes smaller (e.g., see 55 (Y4) of FIG. 10), so that it is likely that the fuel spray is released outwardly in the radial direction B.

As shown in FIG. 10, the upper-side-cavity length 52L and the squish-area length 55L are identical in the present embodiment. Meanwhile, the squish area 55 is positioned on the outward side, in the radial direction B, of the upper-side cavity 52, so that the squish area 55 has a slightly wider area than the upper-side cavity 52 when compared by a circumferential area of the crown surface 50. That is, when compared by a corresponding area per the single injection hole 182 of the injector 18, this corresponding area of the space SP2 above the squish area 55 is slightly wider than that of the space SP1 above the upper-side cavity 52.

Accordingly, it is preferable that the distribution ratio to make the slightly larger amount of fuel spray flow into the space SP2 above the squish area 55 than the space SP1 above the upper-side cavity 52 be set. Specifically, it is preferable that the distribution ratio be set such that SP1:SP2=50:50-40:60. FIG. 11 shows a range of the angle Y having such distribution ratios by an arrow DA. It is apparent from FIG. 11 that the range of the preferable angle Y is about 80°-95°.

Herein, the inclination of the slant flat surface 524 is not considered in a model of FIG. 10. Referring to FIG. 9, the slant flat surface 524 is the flat surface having the inclination of the common tangential line G which makes the angle X with the cylinder axis A0. In a case where the slant flat surface 524 is a flat surface which extends in the radial direction B perpendicular to the cylinder axis A0, the starting point of the guide curved surface 525 becomes a cross point J11 where a downwardly-extending line of the center point Q1C and the circumference of the first imaginary circle Q1 cross each other. However, in a case where the slant flat surface 524 is a flat surface which is inclined relative to the radial direction B, the starting point of the guide curved surface 525 is sifted from the cross point j11 to the contact point j1 by an angle ΔY. That is, an upper limit of the range of the preferable angle Y can be expanded by the angle ΔY.

The angle ΔY is an angle which is originated from the angle X. Accordingly, this angle ΔY can be expressed by using the angle X such that ΔY=180°−(90°+X). Therefore, since the angle Y=90° in the case where the starting point of the guide curved surface 525 is positioned at the cross point j11, the upper limit of the preferable angle Y can be expressed such that Y=90°+ΔY=180°−(90°+X)=180°−X. Further, a lower limit of the preferable angle Y is 80° from the analysis results of FIG. 11. Accordingly, the range of the preferable angle Y is expressed as 80°<Y<(180°−X), wherein 75°<X<80°.

The above-described range of the angle Y is effective particularly for the combustion chamber 6 provided with the relatively-narrow squish area 55 like the present embodiment. As described above, in the present embodiment, the relationship between the radius a of the piston 5 and the radial-direction width b of the squish area 55 is set such that a/b=8-4. In the combustion chamber 6 provided with the narrow squish area 55, if the distribution of the fuel spray is not optimized, it is likely that there occur concerns that the fuel spay may adhere to the inner wall surface of the cylinder 2 (excessive distribution) or the oxygen exiting in the space SP2 above the squish area 55 may not be effectively utilized (insufficient distribution). These problems can be solved by setting the range of the angle Y as 80°<Y<(180°−X).

<Relationship Between First Curved Surface and Second Lip>

Figure 12:
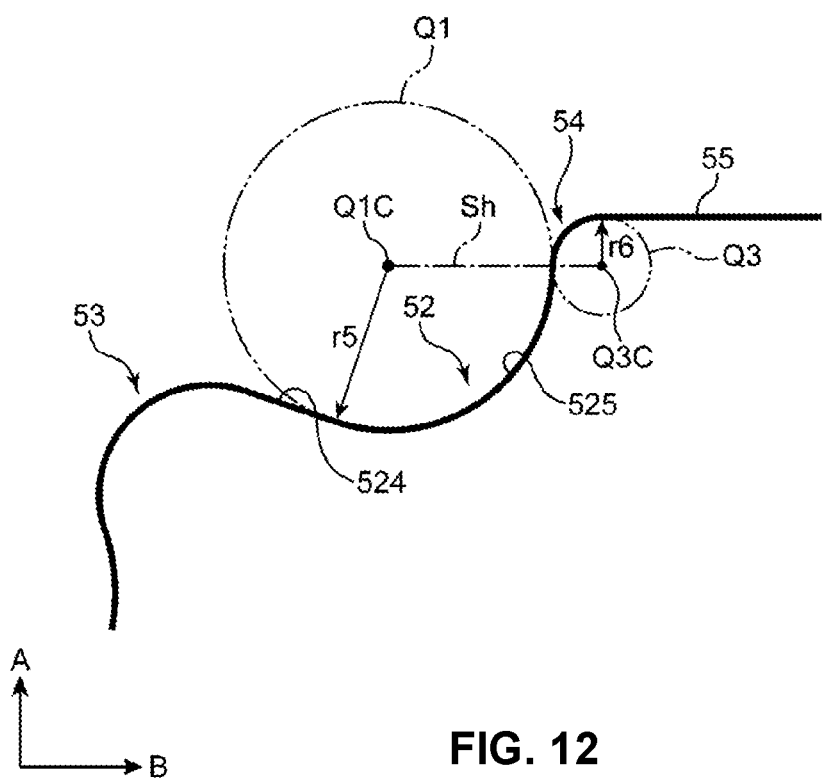
FIG. 12 is a schematic diagram explaining a preferable curved-surface shape of the upper-side cavity.

FIG. 12 is a diagram explaining a preferable relationship between the upper-side cavity 52 (the guide curved surface 525) and the second lip 54. As described above referring to FIG. 4, it is preferable that the guide curved surface 525 and the second lip 54 be set such that the relationship expressed by r5+r6=Sh is satisfied. As described above, the guide curved surface 525 is the curved surface extending along the circumference of the first imaginary circle Q1 having the radius r5, and the second lip 54 is the curved surface extending along the circumference of the third imaginary circle Q3 having the radius r6. FIG. 12 shows the cavity shape in which the distance Sh between the center point Q1C of the first imaginary circle Q1 and the center point Q3C of the third imaginary circle Q3 is equal to a total of the radius r5 and the radius r6. In this case, an imaginary line showing the distance Sh is parallel to the flat surface of the squish area 55.

In a case of the relationship expressed by r5+r6>Sh, the above-described parallel relationship collapses, so that the second lip 54 becomes a curved surface protruding inwardly, in the radial direction B, relative to the guide curved surface 525 or the guide curved surface 525 becomes a type of curved surface which does not rise sufficiently upwardly in the cylinder-axis direction A. In the former case, the connection point j3 (FIG. 9) of the terminal point of the guide curved surface 525 to the second lip 54 is located, along the circumference of the first imaginary circle Q1, at a more-upward and inward position. Accordingly, the fuel spray is excessively introduced into the space SP1 above the cavity 52. In the latter case, the connection point j3 is located at a lower position, so that the fuel spray is excessively introduced into the space SP2 above the squish area 55. If the distance Sh is too small relative to r5+r6, the above-described tendency is remarkable. Herein, in the case of r5+r6<Sh, some kind of intermediate surface exists between the guide curved surface 525 and the second lip 54. Herein, if this intermediate surface has a larger area, the distribution of the fuel spray may be affected. Therefore, it may be inappropriate that the distance Sh is too large relative to r5+r6.

<Fuel Injection Timing>

Figure 13:
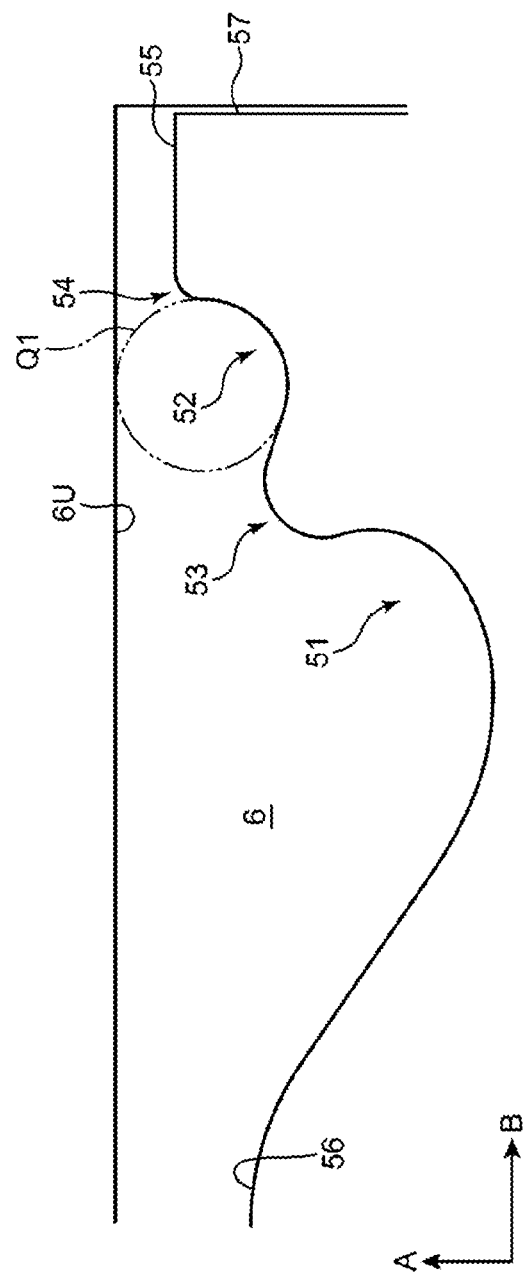
FIG. 13 is a schematic diagram explaining a preferable fuel injection timing.

FIG. 13 is a schematic diagram explaining the preferable timing of the fuel injection executed by the injector 18. As shown in FIG. 13, it is preferable that the fuel injection controller 18A (FIG. 1) set the fuel injection timing set such that the fuel spray flows into the upper-side cavity 52 at a timing when an uppermost end of the first imaginary circle Q1 contacts the combustion-chamber ceiling surface 6U while the piston 5 lowers.

The fuel spray flowing into the upper-side cavity 52 is guided by the guide curved surface 525 extending along the first imaginary circle Q1, and then flows upwardly out of the upper-side cavity 52 (see arrows F32, F33 of FIG. 8). By setting the fuel injection timing as described above, the combustion effectively utilizing the oxygen existing in the spaces SP1, SP2 above the upper-side cavity 52 and the squish area 55 which expand gradually according to the lowering of the piston 5 can be achieved.

Further, a part of the fuel spray which has flowed upwardly out of the upper-side cavity 52 flows inwardly in the radial direction B, and this part of the fuel spray tends to advance in a flow path which extends along the first imaginary circle Q1. Accordingly, the fuel spray can be suppressed from hitting against the combustion-chamber ceiling surface 6U by making the fuel spray flow into the upper-side cavity 52 at the timing when the uppermost end of the first imaginary circle Q1 contacts the combustion-chamber ceiling surface 6U. That is, while hitting of the fuel spray against the ceiling surface 6U so weakens the flow of the fuel spray that the fuel spray may not sufficiently spread into the spaces SP1, SP2 above the upper-side cavity 52 and the squish area 55, this problem of insufficient spreading can be properly prevented.

The timing of the uppermost end of the first imaginary circle Q1 contacting the combustion-chamber ceiling surface 6U is about crank angle CA=5-10 degrees. Accordingly, the fuel injection controller 18A makes the injector 18 execute the fuel injection at an earlier timing than the crank angle CA=5-10 degrees at the latest. Herein, the main-injection P2E shown in FIG. 5 and the single injection P4 shown in FIG. 6 are the injections with the injection timing including the above-described timing.

Validation Examples

Subsequently, validation examples regarding the flow state of the fuel spray will be described referring to the embodiment and comparative examples 1, 2. The fuel-injection pattern is used by the one of the single injection P4 shown in FIG. 6 (the fuel-injection period=ATDC −8°−+27 degrees).

Embodiment

FIGS. 14A-14D and FIGS. 15A-15D show the flow states of the fuel spray in the combustion chamber 6 partitioned by the bottom surface of the upper-side cavity 52 according to the present embodiment in which the angle Y of the guide curved surface 525 is set as 80°<Y<(180°−X). Herein, adding of the reference characters of the respective portions of the piston 5 is omitted in the other figures than FIG. 14A. In the figures, a spreading manner of the fuel spray is shown, wherein a gray level is set such that the darker the gray level is, the higher the fuel density is.

Figure 14A:
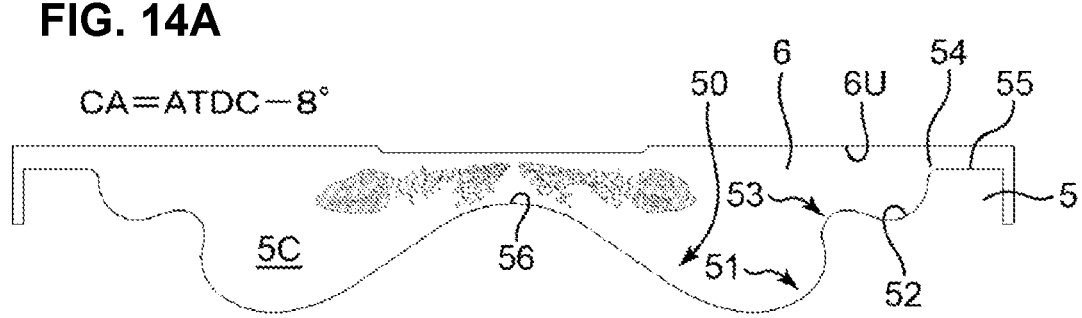
FIGS. 14A-14D are diagrams showing respective flow states of the fuel spray in a combustion chamber provided with a bottom surface which is partitioned by the upper-side cavity according to an embodiment of the present invention.
Figure 14B:
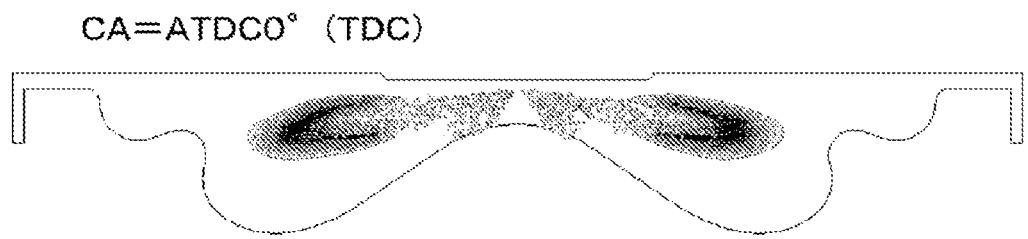

FIGS. 14A, 14B, 14C and 14D show the respective flow states of the fuel spray at the timings of the crank angle CA=ATDC −8°, 0°, 10° and 20°. FIG. 14A of CA=ATDC −8° shows the state at the timing right after the starting of the fuel injection injected by the injector 18 toward the cavity 5C in the single injection P4. FIG. 14B of CA=ATDC 0° shows the state where the fuel spray goes toward the wall surface of the cavity 5C but not reach there yet. The piston 5 is located at the uppermost compression top dead center, so that the fuel spray faces a part of the wall surface close to the lower-side cavity 51.

Figure 14C:
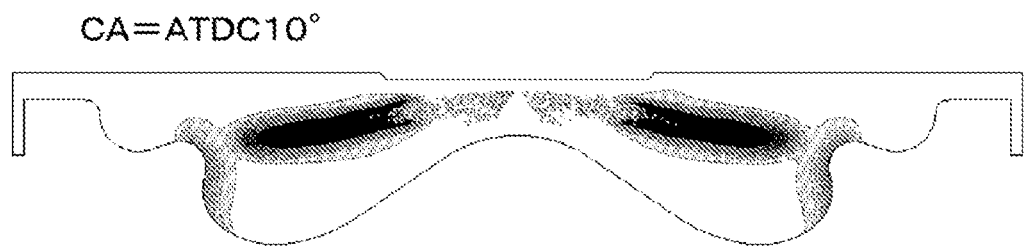

At the timing CA=ATDC 10° of FIG. 14C, a head (lead) part of the fuel spray hits against the first lip 53. As explained referring to FIG. 13, the timing around ATDC 10° is the one when the uppermost end of the first imaginary circle Q1 contacts the combustion-chamber ceiling surface 6U while the piston 5 lowers from the compression top dead center. It is apparent that the fuel spray starts flowing into the upper-side cavity 52 at this timing as shown in FIG. 14C. The starting timing of the fuel injection in the single injection P4 is set by calculating back from the above-described flowing-into starting timing.

Figure 14D:
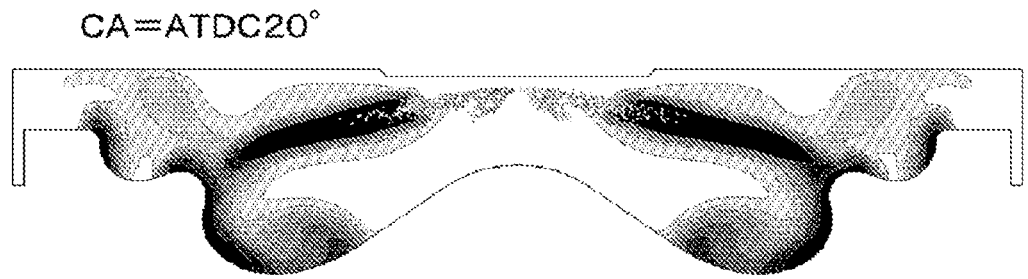

It is apparent that the fuel spray at the timing CA=ATDC 20° of FIG. 14D flows in the same manner as the flowing shown in FIG. 7. That is, the fuel spray hitting against the first lip 53 is divided into a part flowing into the lower-side cavity 51 and another part flowing into the upper-side cavity 52, wherein the format part is directed inwardly, in the radial direction, by being guided by the lower-side cavity 51, and the latter part is directed outwardly, in the radial direction, by being guided by the upper-side cavity 52.

FIGS. 15A, 15B, 15C and 15D show the respective flow states of the fuel spray at the timings of the crank angle CA=ATDC 25°, 30°, 40° and 50°. At the timing CA=ATDC 25° of FIG. 15A, the fuel spray guided by the upper-side cavity 52 (the guide curved surface 525) flows into the space SP1 above the upper-side cavity 52 and the space SP2 above the squish area 55 which expand gradually according to the lowering of the piston 5 (see FIG. 8).

Figure 15A:
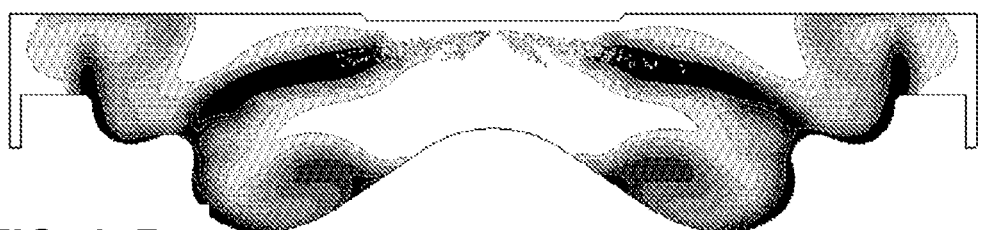
FIGS. 15A-15D are diagrams showing respective flow states of the fuel spray in the combustion chamber provided with the bottom surface which is partitioned by the upper-side cavity according to the embodiment of the present invention.
Figure 15B:
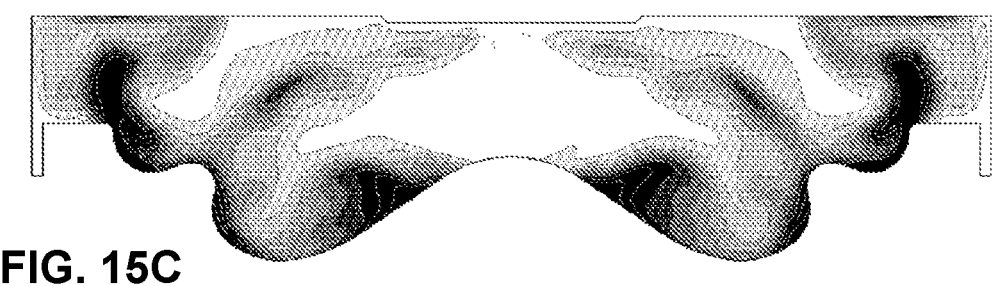
Figure 15C:
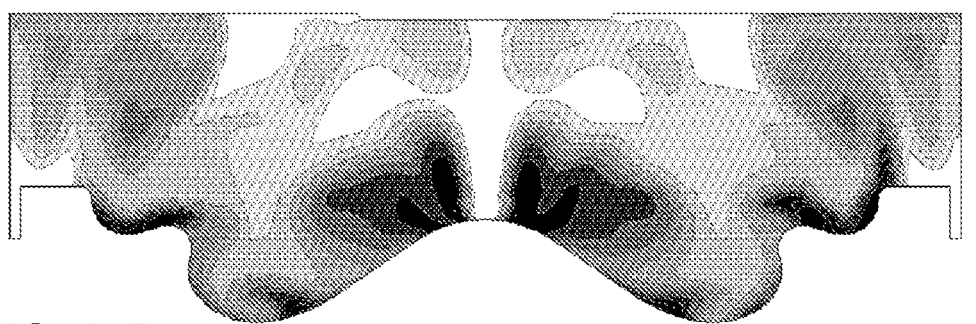
Figure 15D:
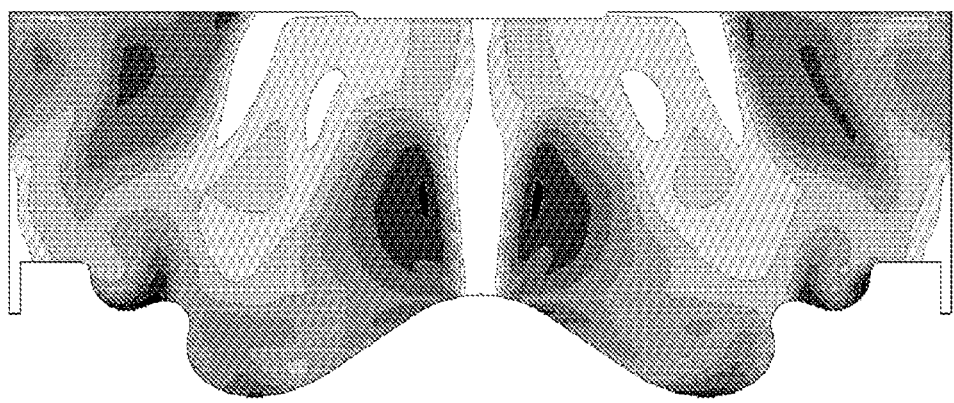

The timing CA=ATDC 30° of FIG. 15B is a state right after the completion of the fuel injection of the injector 18. It is apparent that the fuel spray is distributed to the space SP1 above the upper-side cavity 52 and the space SP2 above the squish area 55 nearly symmetrically relative to a position of the second lip 54. This distribution tendency continues at the timing CA=ATDC 40° of FIG. 15C. The properly-homogenized air-fuel mixture exists in these spaces SP1, SP2. The timing CA=ATDC 50° of FIG. 15D is a state where the combustion is nearly complete.

Comparative Example 1

FIGS. 16A-16D show the flow states of the fuel spray in a case where the angle Y of the guide curved surface 525 is excessive, i.e. in a case where the angle Y exceeds the upper limit (180°−X). FIGS. 16A, 16B, 16C and 16D show the respective flow states of the fuel spray at the timings of the crank angle CA=ATDC 25°, 30°, 40° and 50°. Herein, since the states of ATDC 20° or smaller degrees are not considerably different from the states of FIGS. 14A-14D, those descriptions are omitted here.

Figure 16A:
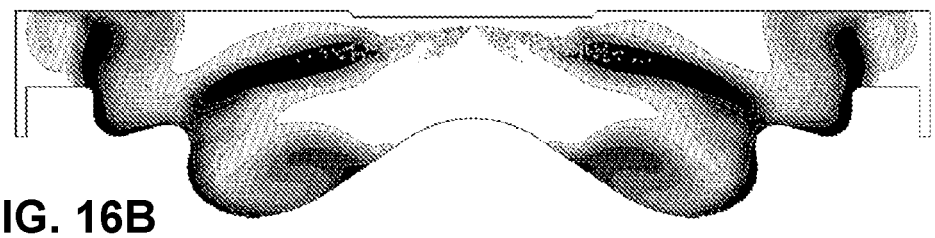
FIGS. 16A-16D are diagrams showing respective flow states of a fuel spray in a combustion chamber provided with a bottom surface which is partitioned by an upper-side cavity according to a first comparative example.

A first comparative example is configured such that since the angle Y is excessive, the upper-side cavity 52 (the guide curved surface 525) has a deeper shape and the second lip 54 protrudes more inwardly in the radial direction, compared with those of the above-described embodiment. FIG. 16A of CA=ATDC 25° shows a state where the fuel spray is guided upwardly by the upper-side cavity 52. At the timing CA=ATDC 30° of FIG. 16B when the fuel injection by the injector 18 is complete, the fuel spray flows into the space SP1 above the upper-side cavity 52 and the space SP2 above the squish area 55 which expand gradually according to the lowering of the piston 5.

Figure 16B:
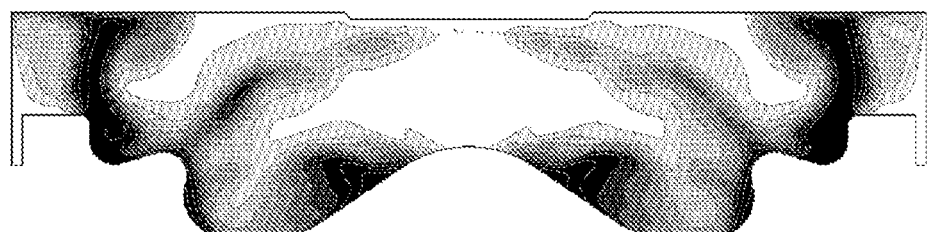
Figure 16C:
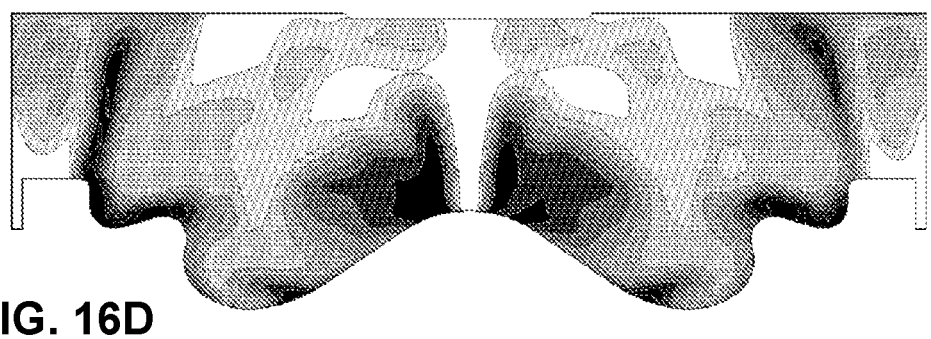
Figure 16D:

As apparent from comparing FIG. 15B and FIG. 16B, in the first comparison, the fuel spray flows into the space SP1 above the upper-side cavity 52 primarily but not flows into the space SP2 above the squish area 55 very much. This is because the angle Y is so excessive that it is difficult to form the fuel spray's flowing directed toward the space SP2 above the squish area 55, so that the fuel spray's flowing is biased toward the space SP1 above the squish area 55. Further, it is apparent that the fuel spray of the first comparative example hits against the combustion-chamber ceiling surface 6U, so that the fuel spray's flowing is stagnant. This biased tendency still continues at the timing CA=ATDC 40° of FIG. 16C. The fuel spray is not homogenized very much in the spaces SP1, SP2. Further, the fuel spray is stagnant in the upper-side cavity 52. Therefore, it can be considered that the oxygen existing in the spaces SP1, SP2 is not sufficiently utilized.

Comparative Example 2

FIGS. 17A-17D show the flow states of the fuel spray in a case where the angle Y of the guide curved surface 525 is insufficient, that is, in a case where the angle Y is smaller than the lower limit 80°. FIGS. 17A, 17B, 17C and 17D show the respective flow states of the fuel spray at the timings of the crank angle CA=ATDC 25°, 30°, 40° and 50°. Herein, since the states of ATDC 20° or smaller degrees are not considerably different from the states of FIGS. 14A-14D, those descriptions are omitted here.

Figure 17A:
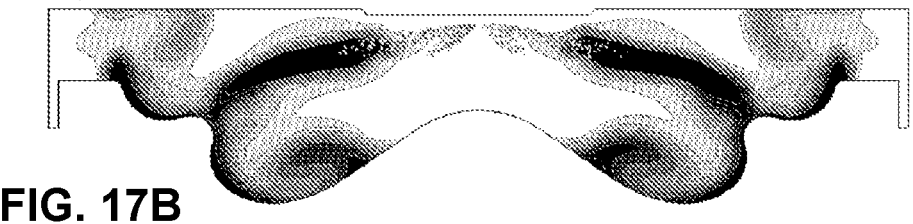
FIGS. 17A-17D are diagrams showing respective flow states of a fuel spray in a combustion chamber provided with a bottom surface which is partitioned by an upper-side cavity according to a second comparative example.

In a second comparative example, since the angle Y is insufficient, the upper-side cavity 52 (the guide curved surface 525) is shallower than the above-described embodiment. FIG. 17A of CA=ATDC 25° shows a state where the fuel spray is guided upwardly by the upper-side cavity 52. In a state shown by FIG. 17B of CA=ATDC 30°, the fuel spray flows into the space SP1 above the upper-side cavity 52 and the space SP2 above the squish area 55 which expand gradually according to the lowering of the piston 5.

Figure 17B:
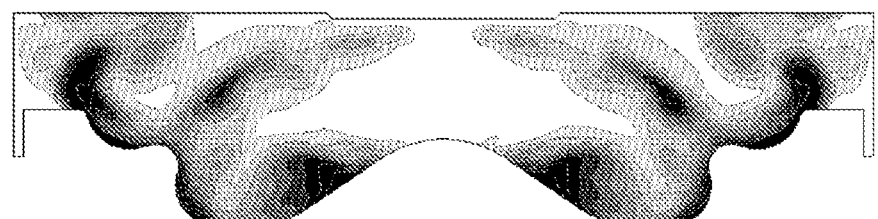
Figure 17C:
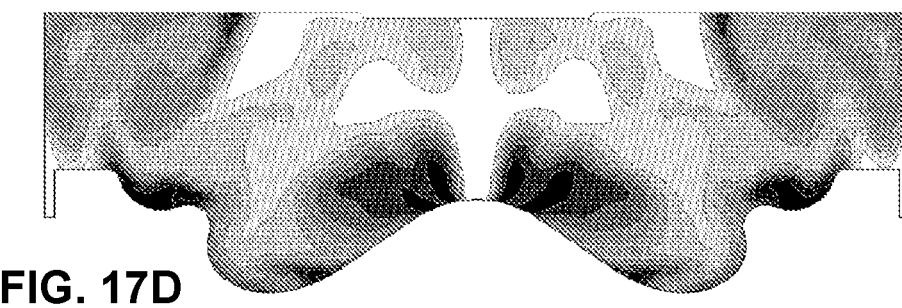
Figure 17D:
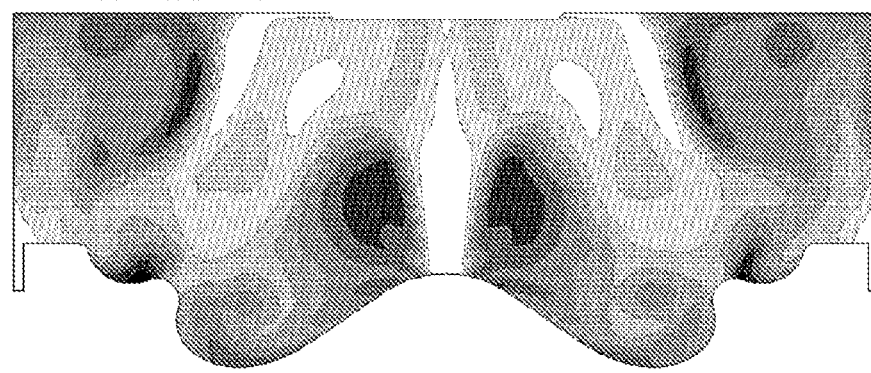

As apparent from comparison of FIG. 17B with FIG. 15B, the rising degree of the fuel spray from the upper-side cavity 52 is so slow in the second comparative example that the fuel spray's flowing is stagnant and biased toward the space SP2 above the squish area 55. This is because the angle Y is insufficient, so that the inwardly-guiding effect performed by the guide curved surface 525 is so weak that the fuel spray's flowing toward the space SP2 is generated relatively strongly. As a result, the fuel spray comes to contact the inner wall surface of the cylinder 2 as shown in FIG. 17C of CA=ATDC 40°. Further, the fuel spray is stagnant in the upper-side cavity 52. Accordingly, it can be considered that the fuel spray's flowing which sufficiently utilizes the space SP1 above the upper-side cavity 52 and the space SP2 above the squish 55 is not generated.

Modified Example

While the embodiment of the present invention has been described, the present invention should not be limited to the above-described embodiment. For example, the following modifications are applicable.

(1) The above-described embodiment exemplified a manner in which the upper-side cavity 52 includes the slant flat surface 524, that is—the slant flat surface 524 extending along the common tangential line G of the first imaginary circle Q1 and the second imaginary circle Q2 exists between the first lip 53 and the guide curved surface 525. It may be configured such that the upper-side cavity 52 does not include the slant flat surface 524, in place of the above-described embodiment.

FIG. 18 is a schematic diagram showing a shape of the upper-side cavity 52 according to a modified example. The guide curved surface 525 is the curved surface extending along the circumference of the first imaginary circle Q1 and the first lip 53 is the curved surface extending along the circumference of the second imaginary circle Q2, which is the same as the above-described embodiment shown in FIG. 9. However, this modified example is different from the above-described embodiment in a point where the starting point of the guide curved surface 525 is connected to the first lip 53 directly. In this modified example, the first-and-second imaginary circles Q1, Q2 contact each other, so that the common tangential line interposed between the center points Q1C, Q2C of the both imaginary circles Q1, Q2 becomes a single common tangential line G shown in FIG. 18. Herein, while a contact point of the common tangential line G with the second imaginary circle Q2 is close to a contact point with the first imaginary circle Q1 as much as possible in the modified example, the present invention includes this modification as well. Even in a case where this modified example is adopted, the angle X which the common tangential line G makes with the cylinder axis A0 is set as 75°<X<80°.

(2) The second lip 54 of the above-described embodiment is the curved surface which extends along the circumference of the third imaginary circle Q3 having the specified radius r6. However, the second lip 54 may be formed by a corner portion, not by the curved surface. That is, the second lip 54 may be configured such that r6=0.

(3) The above-described embodiment exemplified the cavity 5C in which the lower-side cavity 51 has a larger volume than the upper-side cavity 52. Respective volumes of the both cavities may be set properly, and the volume of the upper-side cavity 52 may be set to be larger than that of the lower-side cavity 51.

What is claimed is:

1. A compression ignition engine, comprising:
a combustion chamber formed by a cylinder, a crown surface of a piston, and a ceiling surface of a cylinder head;
a fuel injector provided at a central portion, in a radial direction, of the ceiling surface and injecting fuel into the combustion chamber;
an upper-side cavity provided at the crown surface of the piston, the upper-side cavity being configured to have a ring shape, in a top view, and be recessed downwardly, in a cylinder-axis direction, from the crown surface;
a lower-side cavity provided at the crown surface of the piston on an inward side, in the radial direction, of the upper-side cavity and on a downward side, in the cylinder-axis direction, of the upper-side cavity, the lower-side cavity being configured to be recessed downwardly, in the cylinder-axis direction, from the crown surface;
a first lip provided at the crown surface of the piston and connecting the upper-side cavity and the lower-side cavity, the first lip being configured to have a curved surface protruding inwardly in the radial direction of the cylinder; and
a squish area provided at the crown surface of the piston on an outward side, in the radial direction, of an upper end, in the cylinder-axis direction, of the upper-side cavity, the squish area being a flat surface extending in a direction perpendicular to a cylinder axis,
wherein said upper-side cavity has a first curved surface which extends upwardly in the cylinder-axis direction, protruding outwardly in the radial direction, along a circumference of a first imaginary circle, in a section along the cylinder-axis direction,
said first lip has a second curved surface which is an arc shape and extends along a circumference of a second imaginary circle in a section along the cylinder-axis direction,
an angle (X) which the cylinder axis makes with a common tangential line of said first imaginary circle and said second imaginary circle which is interposed between respective center points of said first and second imaginary circles and configured such that a contact point thereof with the second imaginary circle is positioned on an inward side, in the radial direction, of a contact point thereof with the first imaginary circle is set within a range of 75 to 80 degrees (75°<X<80°), and
said first curved surface of the upper-side cavity is configured such that an angle (Y) of the first curved surface which occupies at the circumference of the first imaginary circle is set within a range of 80 to (180−said angle X) degrees (80°<Y<(180°−X)).

2. The compression ignition engine of claim 1, wherein said upper-side cavity includes a slant flat surface which extends from a connection portion thereof to said first lip up to a starting point of said first curved surface and lowers toward an outward side in the radial direction.

3. The compression ignition engine of claim 2, wherein said slant flat surface is configured such that an inclination thereof substantially matches an inclination of an injection-hole axis which corresponds to a fuel-injection direction of fuel injected from an injection hole of said fuel injector.

4. The compression ignition engine of claim 1, wherein
a second lip connecting said first curved surface and said squish area is provided at said crown surface of the piston, said second lip has a third curved surface which extends along a circumference of a third imaginary circle, wherein the third imaginary circle is positioned on the outward side, in the radial direction perpendicular to the cylinder-axis direction, of the first imaginary circle, and
a radius (R1) of the first imaginary circle, a radius (R2) of the third imaginary circle, and a distance (Sh), in the radial direction, between the respective center points of the first and second imaginary circles are set such that a relationship expressed by R1+R2=Sh (including R2=0) is satisfied.

5. The compression ignition engine of claim 1, wherein a radius (a) of said piston and a width (b), in the radial direction, of said squish area are set such that a ratio (a/b) of said radius (a) to said width (b) falls within a range of 8-4.

6. The compression ignition engine of claim 1, further comprising a fuel injection controller to control execution of fuel injection of said fuel injector, wherein said fuel injection controller sets a fuel injection timing such that a fuel spray injected by the fuel injector flows into said upper-side cavity at a timing when said first imaginary circle contacts said ceiling surface of the combustion chamber while the piston lowers.

7. The compression ignition engine of claim 1, further comprising a fuel injection controller to control execution of fuel injection of said fuel injector, wherein said fuel injection controller is configured to execute a pre-injection in which the fuel is injected at an advanced timing from a compression top dead center and a main-injection in which the fuel is injected at a delayed timing from the injection timing of said pre-injection, and said fuel injection controller is configured to set the respective fuel injection timings of said pre-injection and said main-injection such that a fuel spray injected by the pre-injection and at least a latter half of a fuel spray injected by the main-injection flow into said upper-side cavity.

8. The compression ignition engine of claim 1, wherein
a first center point of the first imaginary circle is positioned on the outward side, in the radial direction perpendicular to the cylinder-axis direction, of a second center point of the second imaginary circle, and
the first imaginary circle and the second imaginary circle do not overlap.

9. The compression ignition engine of claim 4, wherein
the upper-side cavity has a recess-shaped curved surface with a radius (r5) which extends from the second bottom portion to the guide curved surface, and
the second lip has a convex-shaped curved surface with a radius (r6), and
when a distance, in the radial direction B, between a central point of the radius (r5) and a central point of the radius (r6) is defined as a second distance (Sh), the relationship expressed by r5+r6=Sh (herein, including r6=0) is satisfied.

10. The compression ignition engine of claim 1, wherein
the pre-injection is executed toward the first lip, wherein the fuel injection controller makes the injector execute the pre-injection at the timing when the first lip of the piston going up in the compression stroke and the injection-hole axis cross each other, and thereby the fuel spray hits against the first lip.

11. The compression ignition engine of claim 1, wherein
the fuel spray which has hit against the first lip is divided into a first portion directed toward the lower-side cavity and a second portion directed toward the upper-side cavity,
the fuel injected toward the central portion of the first lip is divided vertically, and
the vertically-divided fuel comes to flow along the respective surfaces of the cavities, forming the air-fuel mixture together with the air existing in the cavities.

* * * * *